United States Patent
Jain et al.

(10) Patent No.: US 7,902,800 B2
(45) Date of Patent: Mar. 8, 2011

(54) ADAPTIVE POWER SUPPLY AND RELATED CIRCUITRY

(75) Inventors: Praveen K. Jain, Kingston (CA); Shangzhi Pan, Kingston (CA)

(73) Assignee: CHiL Semiconductor Corporation, Tewksbury, MA (US)

( * ) Notice: Subject to any disclaimer, the term of this patent is extended or adjusted under 35 U.S.C. 154(b) by 328 days.

(21) Appl. No.: 12/141,787

(22) Filed: Jun. 18, 2008

(65) Prior Publication Data
US 2009/0230930 A1    Sep. 17, 2009

Related U.S. Application Data

(63) Continuation-in-part of application No. 11/879,043, filed on Jul. 13, 2007, now Pat. No. 7,772,811.

(51) Int. Cl.
*G05F 1/613* (2006.01)
(52) U.S. Cl. .............................. 323/224; 323/283
(58) Field of Classification Search ............ 323/283, 323/284, 291, 224
See application file for complete search history.

(56) References Cited

U.S. PATENT DOCUMENTS
7,602,164 B2 * 10/2009 Vo ............................. 323/282
* cited by examiner

*Primary Examiner* — Shawn Riley
(74) *Attorney, Agent, or Firm* — Chapin IP Law, LLC; Paul P. Kriz, Esq.

(57) ABSTRACT

A power supply configuration includes a monitor circuit to monitor an output voltage and output current of a power supply. The output voltage can be used to supply power to a dynamic load. The power supply varies a rate of changing an adaptive output voltage reference value that tracks the output voltage. Based on a comparison of the output voltage with respect to the adaptive output voltage reference voltage value, a controller associated with the power supply controls switching operation of the power supply to maintain the output voltage within a voltage range. For example, modifying the rate of changing the adaptive output voltage reference value over time depending on current operating conditions of the power supply changes a responsiveness and ability of the power supply to provide current to the dynamic load.

29 Claims, 17 Drawing Sheets

ADAPTIVE POWER SUPPLY AND RELATED CIRCUITRY

RELATED APPLICATIONS

This application is a continuation-in-part and claims priority to earlier filed U.S. patent application Ser. No. 11/879,043 entitled "POWER SUPPLY CONFIGURATIONS AND ADAPTIVE VOLTAGE,", filed on Jul. 13, 2007 now U.S. Pat. No. 7,772,811, the entire teachings of which are incorporated herein by this reference.

BACKGROUND

It is known that a conventional voltage regulator module (VRM) can be used to regulate a DC voltage supplied to a load such as a microprocessor. A VRM can include a power converter, such as a DC-DC converter, and may include other components such as a controller for controlling operation of the power converter.

An example of a DC-DC converter is a synchronous buck converter, which has minimal components, and therefore is widely used in VRM applications. In an example application, the input voltage to the buck converter is typically $12V_{DC}$. An output voltage produced by the VRM may be $5.0V_{DC}$, $3.3V_{DC}$, or even lower.

Conventional multiphase interleaved VRM power supply topologies can include two or more power converter phases that operate in parallel with each other to convert power and supply power to a corresponding load. Implementation of a multiphase voltage converter topology (as compared to a single voltage converter phase topology) can therefore enhance the output current capability of a power supply system.

A typical configuration of a VRM such as a so-called synchronous buck converter includes an inductor, a high side switch, and a low side switch. A controller associated with the buck converter repeatedly pulses the high side switch ON to convey power from a power source through the inductor to a dynamic load.

To maintain an output voltage at a relatively fixed value, the controller repeatedly pulses between activating a high side switch and low side switch to effectively alternate between connecting a node of an inductor to a voltage source and ground in order to control an output of the buck converter. Energy stored in the inductor increases during a time when the high side switch is ON and decreases during a time when the low side switch is ON. During switching operation, the inductor transfers energy from the input to the output of the converter to keep the output voltage relatively constant.

Today's microprocessors and high performance ASIC chips can operate on low voltages and require a wide range of currents such as less than 1 Ampere and over 100 amperes. A load can operate at these extremes of current for long or short periods of time.

SUMMARY

Conventional voltage converter circuits as discussed above can suffer from a number of deficiencies. For example, to meet transient requirements, conventional voltage regulator circuits must sometimes employ use of many capacitors to temporarily store energy that will be supplied to a dynamic load on an as-needed basis. Use of many bulk capacitors in a respective power supply circuit increases both its size and associated cost. Additionally, a power supply circuit having an excessive number of so-called bulk capacitors may be more prone to failure because the parts themselves can fail and the capacitors must be connected to the board. The connections to the board can fail. Thus, use of an excessive number of bulk/filter capacitors is often undesirable.

The conventional concept of adaptive voltage positioning (a.k.a., AVP) has been widely used in more recent conventional voltage regulator designs. Adaptive voltage positioning entails controlling a power supply output voltage, Vo, with respect to a fixed reference voltage, Vref, so that a respective power supply circuit has a corresponding fixed output impedance.

For example, one conventional AVP method includes employing a fixed reference voltage in a respective conventional power supply circuit. A controller associated with the power supply controls a power supply output voltage based on Vref–Io $R_{ESR}$, instead of driving the output voltage of the power supply with respect to Vref. In such a case, the power converter circuit behaves as a voltage source with value Vref and output impedance that is always real and equal to $R_{ESR}$.

It is sometimes impossible to achieve a substantially fixed power supply output impedance via use of a voltage-mode control. In a so-called current-mode control application, the AVP design depends on the accuracy of the DC (Direct Current) gain. A technique known as active droop control can be used to solve these problems by using an infinite DC gain design. However, the time constant of output filtering capacitor can have a significant impact on the feedback loop design and the converter performance. It is therefore often difficult to precisely maintain a desired output impedance via conventional methods. Moreover, it's not easy to modify the output impedance while the power supply is online (e.g., actively maintaining an output voltage and driving a load).

Techniques discussed herein deviate with respect to conventional techniques. For example, certain embodiments herein are directed to enhancing an ability of a power supply circuit to provide high transient current to dynamic loads, without imparting or generating substantial "ringing" on the power supply output voltage under such transient conditions.

More specifically, an example power supply can include a monitor circuit to monitor an output voltage of a power supply. The output voltage is used to supply power to a dynamic load. The power supply varies a rate of changing an adaptive output voltage reference value. Based on a comparison of the output voltage with respect to the adaptive output voltage reference voltage value, a controller associated with the power supply controls switching operation of the power supply to maintain the output voltage within a voltage range. Modifying the rate of changing the adaptive output voltage reference value over time depending on current operating conditions of the power supply changes a responsiveness and ability of the power supply to provide current to the dynamic load.

The power supply according to embodiments herein can also include an adaptive output current reference value that changes in unison with (relative to, along with, etc.) the adaptive output voltage reference value. Thus, both the adaptive output voltage reference value and the adaptive output current reference value can be time-varying signals.

In one embodiment, the time-varying adaptive output voltage reference value can track (or be proportional to) the power supply output voltage. Note that the adaptive output voltage reference value can be changed in a continuous manner rather than stepwise. Via a comparison of the power supply output voltage with respect to the time-varying or adaptive output voltage reference value and/or a comparison of the output current to the corresponding time-varying output current reference value, a controller circuit associated with the power supply controls switching operation of the power supply to regulate the power supply output voltage.

In further embodiments, a corresponding reference voltage generator produces the time-varying output voltage reference (e.g., an adjustable voltage reference value that changes over time as its name suggests) to toggle between different step voltage values such as higher and lower step voltage values depending on a nearness, crossing, etc., of the output voltage with respect to the adaptive output voltage reference value. In one embodiment, the reference voltage generator periodically or occasionally adjusts the time-varying output voltage reference by a step amount so that the time-varying output voltage reference value tracks the power supply output voltage.

In an example embodiment, during operation, the reference voltage generators set the time-varying output voltage reference value and the corresponding time-varying output current reference value to different sized step voltage values over time such that the power supply has a substantially fixed output impedance value.

In accordance with yet further embodiments, the reference voltages can be adjusted up and down over time by different sized voltage steps depending on current operating conditions of the power supply. When more current is needed to supply power to a load, the voltage step adjustments with respect to the reference voltages can be relatively larger to increase a responsiveness and/or ability of the power supply to drive the dynamic load.

To maintain a substantially fixed output impedance of a power supply, as the time-varying output voltage reference increases, the corresponding time-varying output current reference decreases and vise-versa. This illustrates an example of how the adaptive output voltage reference value and the adaptive output current reference value can be changed in unison relative to each other. The adaptive output voltage reference value divided by the adaptive output current reference value can represent the output impedance of the power supply. Changing both by an appropriate amount can set the output impedance of the power supply to a relatively fixed or controlled output impedance value for different loads.

As previously discussed, the controller can be configured to compare the output voltage output voltage of the power supply to the adaptive output voltage reference value. The adaptive output voltage reference value is adjusted to track the output voltage. The corresponding adaptive output current reference value is adjusted relative to the adaptive output voltage reference value. At the beginning of a respective switching cycle, the controller initiates activation of a high side regulator switch of the power supply to convey power from one or more source through and a storage device such as an inductor to the dynamic load. Activation of the high side switch increases an amount of output current associated with the power supply output voltage so that the output voltage can maintain the output voltage in a range even though the consumption requirements of the dynamic load changes.

The controller can also monitor an amount of current supplied to the dynamic load. When the amount of current supplied to the dynamic load equals or exceeds a threshold value as set by the adaptive output current reference value, the controller initiates switching the high side switch to an off state. Thus, the power supply according to embodiments herein can include a peak current mode controller.

Thus, according to embodiments herein, the power supply can include a voltage control loop and a current control loop.

Recall that the controller as described herein can be configured to modify the rate of changing the adaptive output voltage reference value over time depending on operating conditions of the power supply. As mentioned, modifying the adaptive output voltage reference value and the adaptive output current reference value changes a responsiveness of the power supply.

For example, depending on the particular operating mode, the power supply circuit controls an output current associated with the output voltage so that the output current is limited to a peak current reference value that varies depending on the adaptive output voltage reference value.

In a first linear control mode of controlling the output current, the reference voltage generator adjusts the peak current reference value by a first step amount for each of multiple adjustment cycles.

In a second linear control mode of controlling the output current, the reference voltage generator adjusts the peak current reference value by a second step amount for each of multiple adjustment cycles. Accordingly, embodiments herein include during a first operational mode, changing the adaptive output voltage reference value or adaptive output current reference value by a first step amount so that the adaptive output voltage reference value follows the output voltage; and during a second operational mode, increasing a rate of changing the adaptive output voltage reference value or adaptive output current reference value by changing the adaptive output voltage reference value by a second step amount.

As will be discussed later in this specification, decreasing or increasing the reference voltages by a step amount can be done over each of multiple successive cycles or sample times. In response to a condition such as detecting that the output voltage is greater than the adaptive output voltage reference value for a time duration or a condition such as that the adaptive output voltage reference value is greater than the output voltage for each of multiple successive sample times in which the adaptive output voltage reference value is compared to the output voltage, the reference voltage generator according to embodiments herein can increase a rate of changing the adaptive output voltage reference value to account for the transient condition.

As further described herein, other methods can be used to detect a transient condition when the dynamic load requires more or less current. For example, a monitor circuit can be configured to monitor a rate of change or level of the output voltage to identify a transient condition.

A size of the second step amount is larger or greater than a size of the first step amount. Because of the larger step voltage values, the second linear control mode provides a faster response for adjusting a magnitude of the output current to maintain the output voltage in the range than does a response associated with the first control mode for adjusting the output current. Thus, the power supply can initiate the second linear mode or a more responsive mode in which the power supply can supply more power to the dynamic load when needed.

It is possible that a transient condition cannot be satisfied by either the first or second linear control mode or any other linear control mode. In response to detecting a transient condition in which the dynamic load consumes additional current than can be provided by the first linear control mode or the second linear control mode (such as within a predetermined amount of time), the power supply can be configured to implement a non-linear control mode including simultaneous activation of at least one high side switch in each of multiple power converter phases of the power supply that provide power to the dynamic load to prevent the output voltage from falling outside the range. Simultaneous activation of multiple high side switches enables the power supply to quickly produce a large amount of current to satisfy the consumption requirements by the dynamic load.

Eventually, operating conditions may warrant that the power supply be switched back to one of the linear control modes for regulating the output voltage and output current associated with the power supply. The transition can include switching from the non-linear control mode to the second linear control mode and, thereafter, to the first linear control mode. The second linear control mode can be a link mode to smooth a transition of the power supply from a non-linear control mode back to a linear control mode.

Thus, embodiments herein can include switching from operating the power supply in a linear mode to a non-linear mode, and vise-versa such as switching from a linear control mode to a non-linear control mode, to produce the output voltage depending on one or more different power supply parameters such as a rate of change associated with the output voltage, a nearness of the output voltage to a target value, ability of a particular mode to provide appropriate output current consumed by the dynamic load, etc. Thus, the cue to switch from one mode to another can be based on any number of different suitable trigger events. In other words, the power supply can be configured to output current according to different slew rates depending on current operating conditions of the power supply and/or load. For example, if the output voltage of the power supply is operating near a target value, the power supply can be operated in a mode having a relatively lower current output slew rate. Conversely, if the output voltage of the power supply is operating far away from a target value or range, the power supply can be operated in a respective mode having a relatively higher current output slew rate.

In one embodiment, the power supply can switch from the first linear control mode directly to a non-linear control mode in which high side switches of multiple power converter phases are simultaneously activated to supply power to the dynamic load. Thus, embodiments herein can include detecting a transient condition. In response to detecting the transient condition, initiating simultaneous activation of one or more high side switches in each of multiple power converter phases of the power supply to supply additional power to the dynamic load during the transient condition.

Conversely, note that a transient condition can include a sudden reduction in current consumption. In such an instance, the power supply can initiate simultaneous activation of one or more low side switches in each of multiple power converter phases to quickly reduce an amount of current supplied to the load.

As discussed above, and as will be discussed below, techniques herein are well suited for use in switching power supply circuitry to enhance the ability of a power supply circuit to provide more/less current during transient condition as well as provide a stable output voltage during transient current conditions. However, it should be noted that embodiments herein are not limited to use in such applications and that the techniques discussed herein are well suited for other applications as well.

Note also that each of the different features, techniques, configurations, etc. discussed herein can be executed independently or in combination with any or all other features also described herein. Accordingly, the present invention can be embodied, viewed, and claimed in many different ways.

This brief description purposefully does not specify every embodiment and/or incrementally novel aspect of the present disclosure or claimed invention. Instead, this brief description only provides a preliminary discussion of different embodiments and corresponding points of novelty over conventional techniques. For additional details and/or possible perspectives or permutations of the invention, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

The concept of Adaptive Voltage Positioning (AVP) has been widely used in designing the voltage regulators (VR) for computer microprocessors. In AVP control, the output voltage ($V_o$) of the regulator decreases with the increasing output current ($I_o$) and vice versa. Use of adaptive voltage positioning can reduce how many output capacitors are needed in a voltage regulator, which can save cost and circuit board area.

The basic idea in AVP is to achieve constant output impedance ($R_o$) of the regulator. In AVP the output voltage of the regulator is given by:

$$V_o = V_{o\,max} - I_o \cdot R_o \qquad \text{(equation 1)}$$

Differentiating equation (1), the output impedance of the regulator is given by:

$$R_o = -\frac{dV_o}{dI_o} \qquad \text{(equation 2)}$$

Digitizing equation (2), the digital expression for the output impedance is given by:

$$R_o = -\frac{\Delta V_o}{\Delta I_o} \quad \text{(equation 3)}$$

Based on equation (3) above, new digital controller circuitry is proposed here to achieve desired AVP control. The idea is to adjust the voltage reference $V_{ref}$ and the current reference $I_{ref}$ over time. The voltage reference $V_{ref}$ decreases while the current reference $I_{ref}$ increases, that's, $V_{ref} = V_{max} - I_{ref} R_o$.

By implementing one or more closed control loops, the output voltage of a power supply such as a buck converter can be regulated under the relationship $V_o = V_{ref} = V_{max} - I_{ref} R_o = V_{max} - I_o R_o$, where $R_o$ is the desired output impedance of the regulator.

Figure 1:
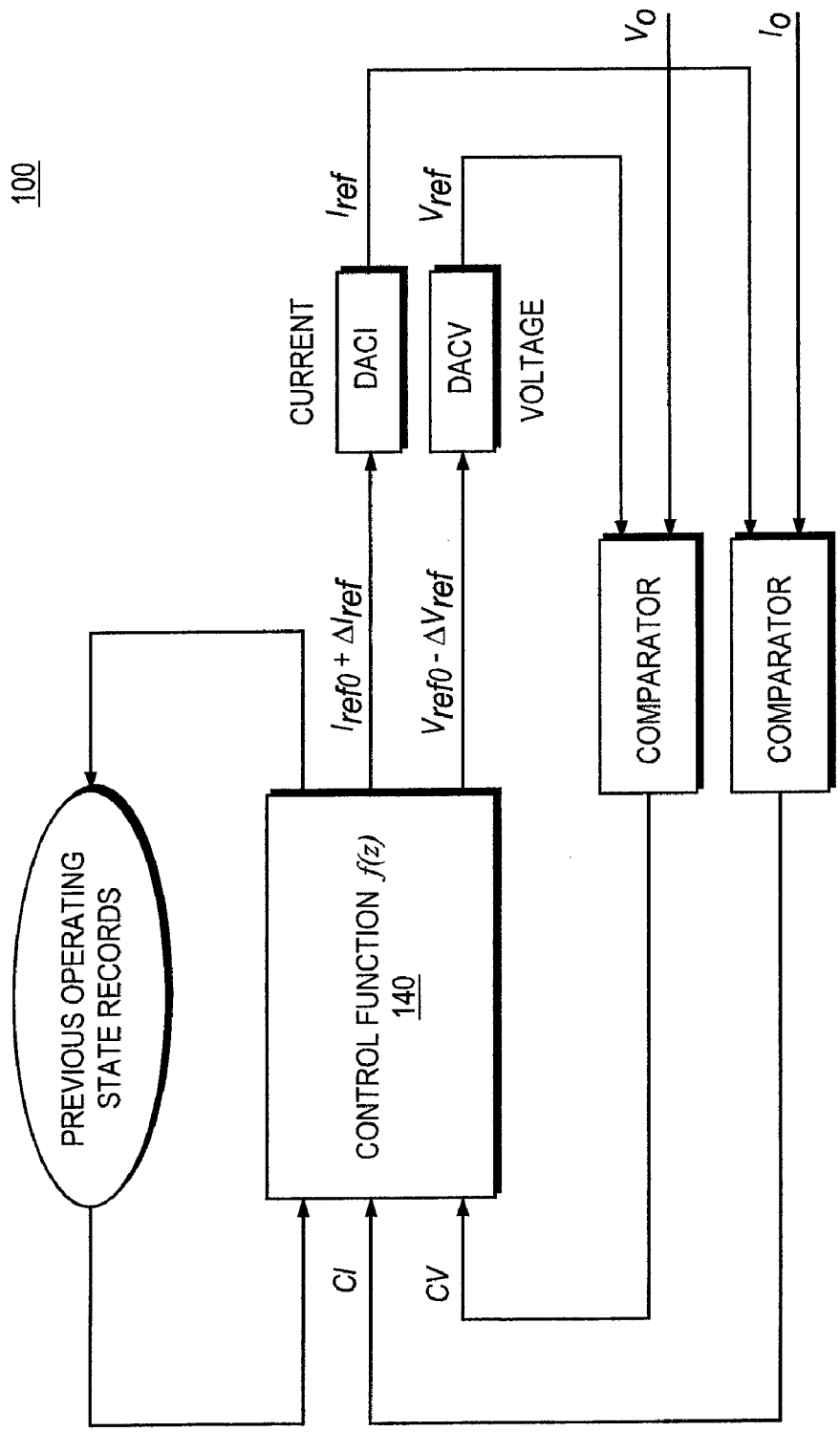
FIG. 1 is an example diagram of a power supply system including a current control loop and a voltage control loop according to embodiments herein.

FIG. 1 is an example diagram illustrating digital controller circuitry 100 according to embodiments herein. The controller 100 includes a control function $f(z)$ in module 140, which defines a relationship function between $\Delta V_{ref}$ and $\Delta I_{ref}$, which is expressed as:

$$\Delta I_{ref} = f(z) \cdot \Delta V_{ref} \quad \text{(equation 4)}$$

Since the AVP is related to the steady state operation of the regulator, the AVP control will be achieved if we make $$f(z \rightarrow 1) = -1/R_o \quad \text{(equation 5)}$$

A sample control function is $$f(z) = -1/R_o \quad \text{(equation 6)}$$

The AVP control discussed herein is for the steady state operation. As will be discussed later in this specification, the controller 100 can switch between different operational modes.

Figure 2:
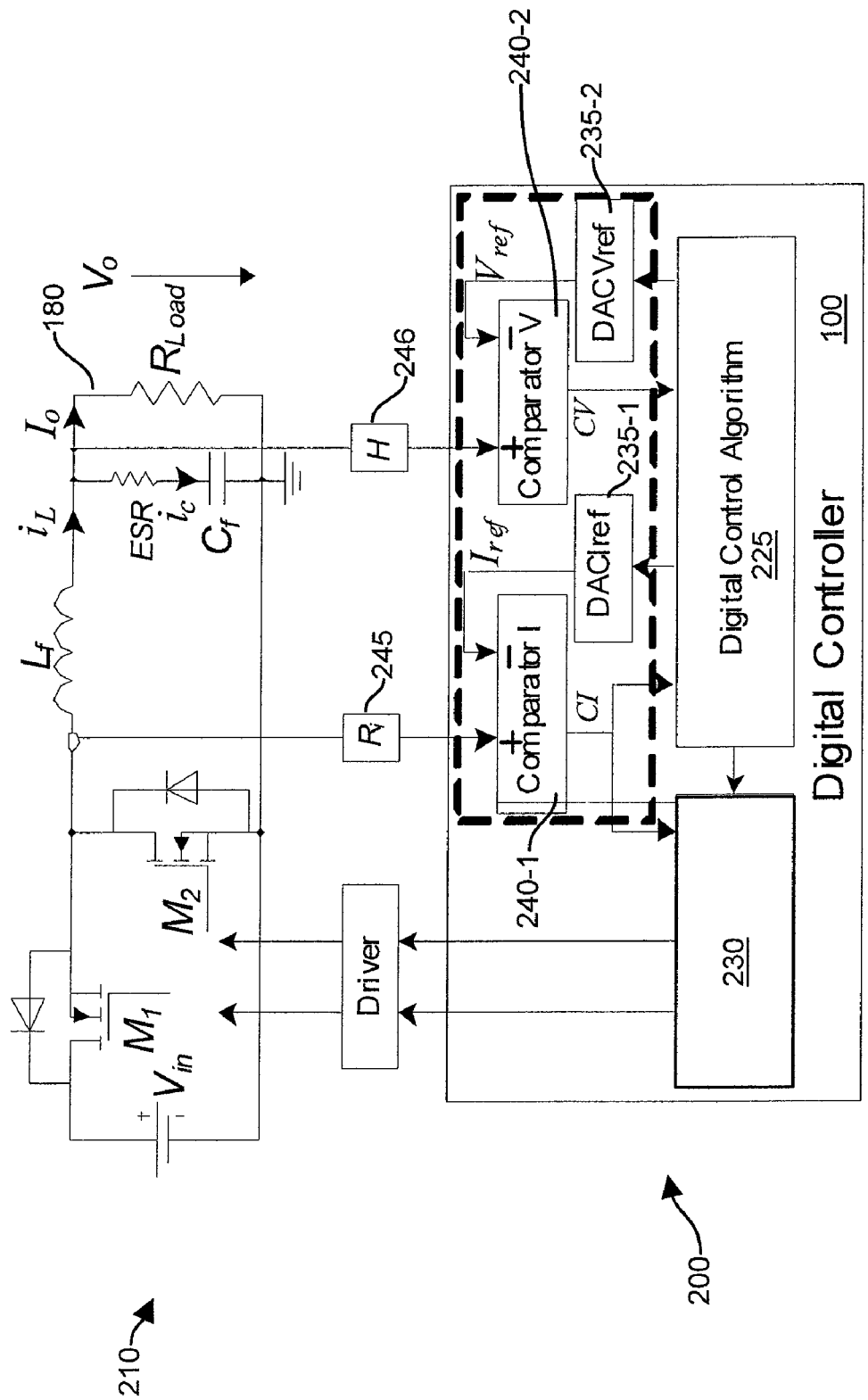
FIG. 2 is an example diagram of a power supply according to embodiments herein.

FIG. 2 is an example diagram illustrating a control circuit 200 according to embodiments herein. The control circuit 200 includes digital controller circuitry 100 as well as a power converter phase 210.

In one embodiment, the digital controller circuitry 100 includes a digital control algorithm 225, a digital pulse width modulation circuit 230, voltage reference generator 235-1 such as a current reference voltage (DACIref) and voltage reference generator 235-2 such as an output voltage reference (DACVref). The digital controller circuitry 100 also includes two comparators comparator 240-1 (Comparator I) and comparator 240-2 (Comparator V).

The digital control algorithm 225 can be implemented to obtain the desired reference current data and the desired reference voltage data. For example, voltage reference generator 235-1 (DACIref) receives the reference current voltage setpoint data from digital control algorithm 225 and generates the peak current voltage reference value, Iref.

Voltage reference generator 235-2 receives the reference voltage data from digital control algorithm 225 and generates the voltage reference $V_{ref}$.

During operation, comparator 240-1 compares the generated peak current reference $I_{ref}$ with the inductor current $i_L$, which is sensed by current monitor 245. Based on a comparison of the current produced by the power converter phase 210 and the reference voltage produced by voltage reference generator 235-1, comparator 240-1 produces output CI, which is sent to the digital control algorithm 225 and the digital pulse width modulation circuit 230.

The digital pulse width modulation circuit 230 generates the gate driving signals to control switch devices such as MOSFETs (M1 & M2) in power converter phase 210.

Comparator 240-2 compares the generated voltage reference $V_{ref}$ as produced by voltage reference generator 235-2, with the output voltage $V_o$ (output voltage 180) of the power converter phase 210. Monitor circuit 246 monitors the output voltage 180 used to drive dynamic load labeled $R_{LOAD}$.

Comparator 240-2 produces comparison result CV, which is forwarded to the digital control algorithm 225. The digital control algorithm 225, in turn, adjusts the current reference data and the voltage reference data according to a control law.

In one embodiment, the digital controller circuitry 100 operates in a fixed-frequency peak current mode control (PCM). The turn-on of high-side switch M1 and the turn-off of low-side synchronous switch M2 are scheduled by the timing information produced by the digital pulse width modulation circuit 230. The digital pulse width modulation circuit 230 initiates turn-off of high-side switch M1 and subsequent turn-on of low-side synchronous switch M2 based on comparison result CI, for comparator 240-1. For example, if the inductor current through inductor $L_f$ increases to a peak current reference set by voltage reference generator 235-1 (DACIref), high-side switch M1 will be turned off and low-side synchronous switch M2 will be turned on.

In one embodiment, to implement adaptive-voltage-positioning (AVP) techniques, the digital controller circuitry 100 reduces the voltage reference $V_{ref}$ while increasing the current reference $I_{ref}$, and vice versa. The two reference voltages can be controlled in unison so that the output impedance of the power converter phase 210 is substantially fixed.

The variation of the current reference $I_{ref}$ can be tracked tightly by the variation of the voltage reference $V_{ref}$. However, the variation of the current reference is driven by the variation of the voltage reference. According to one embodiment, the control law implemented by the digital controller circuitry 100 includes generating the voltage reference, Vref, from voltage reference generator 235-2 to follow the output voltage 180.

If the required load current suddenly increases, the output voltage 180 will drop. In such an instance, the digital control algorithm 225 will reduce the voltage reference, Vref, so that it follows the output voltage 180. The digital controller circuitry 100 will increase Iref correspondingly, until a new steady state is established.

If the required load current decreases, the output voltage will rise. In such an instance, the digital control algorithm 225 will increase the voltage reference so that it follows the output voltage 180. The current reference will be reduced by the digital controller circuitry 100 until a new steady state is established.

Therefore, an example control according to embodiments herein to achieve AVP is summarized as follow:

a. If logic signal CV as produced by comparator 240-2 is high (CV=1), which indicates that the output voltage 180 exceeds the voltage reference Vref set by the voltage reference generator 235-2, the digital control algorithm 225 increases voltage reference Vref by an amount, ΔVref, while decreasing the peak current reference Iref by amount ΔIref. If Vref reaches or exceeds its allowed maximum value, no change will be made on Vref.

b. If logic signal CV as produced by comparator 240-2 is low (CV=0), which indicates that the output voltage 180 is smaller than the voltage reference Vref, the digital control algorithm 225 decreases the reference voltage, Vref, by an amount, ΔVref, while increasing the peak current reference Iref by amount ΔIref. If Vref reaches or exceeds its allowed minimum value, no change will be made on Vref.

Figure 3:
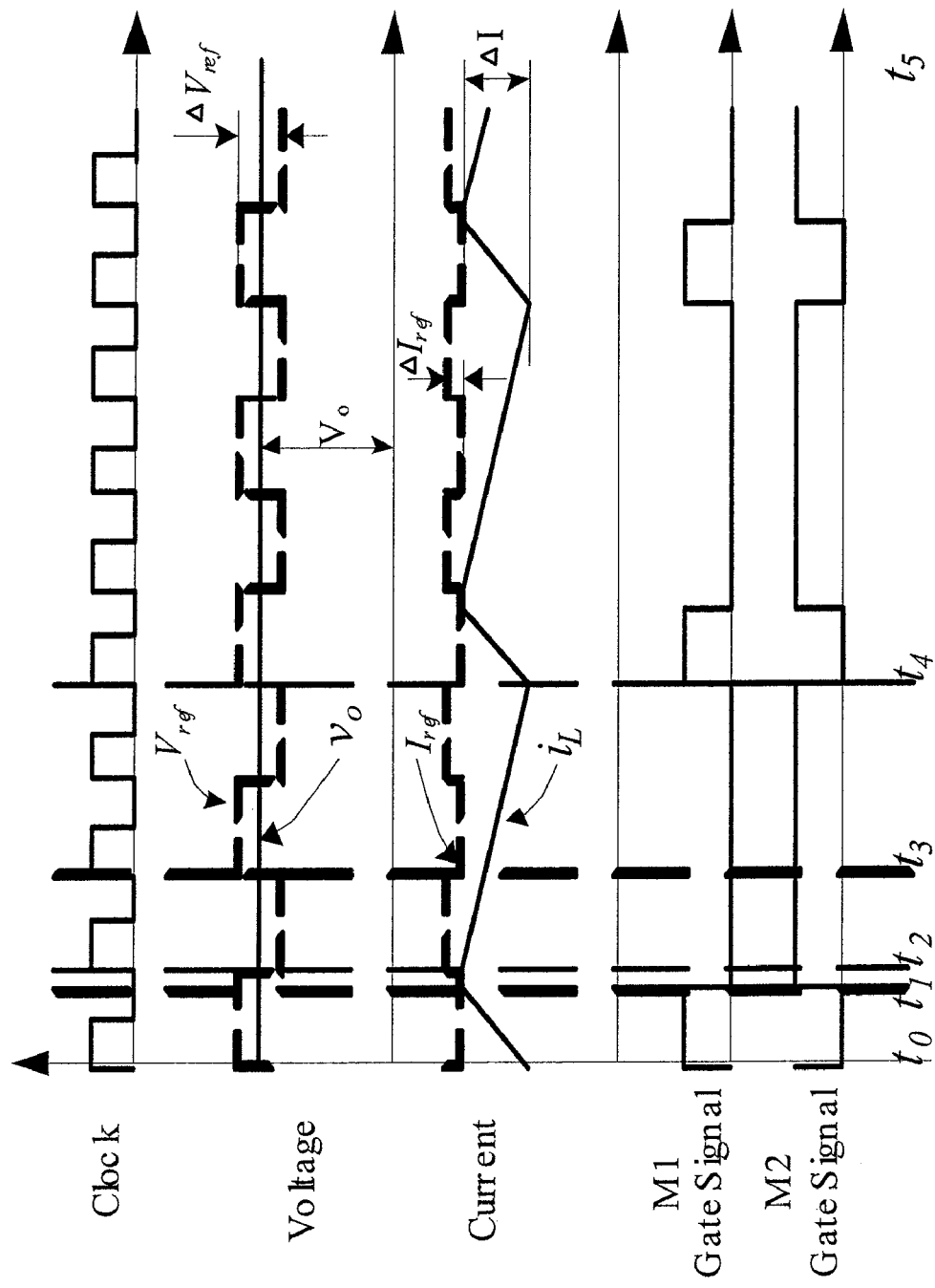
FIG. 3 is an example timing diagram according to embodiments herein.

FIG. 3 is an example timing diagram according to embodiments herein. In general, the timing diagram in FIG. 3 shows the steady state operation waveform of an example buck converter with the digital controller circuitry 100.

As described above, in one embodiment, the buck converter operates under fixed switching frequency peak current mode control. The turn-on of high side switch M1 and the turn-off of low side switch M2 via respective gate signals produced by digital pulse width modulation circuit 230 are scheduled in accordance with the system clock (labeled clock).

The adaptive output voltage reference value is adjusted to track the output voltage. The corresponding adaptive output current reference value is adjusted relative to the adaptive output voltage reference value to maintain a controlled output impedance for the power supply. At the beginning of a respective switching cycle such as at time t0, the controller initiates activation of a high side regulator switch of the power supply to convey power from one or more source through and a storage device such as an inductor to the dynamic load.

In general, for a given switching cycle such as between time t0 and t4 as shown, the digital pulse width modulation circuit 230 initiates activation of high side switch M1 at the beginning of the switching cycle. Activation of the switch results in conveying energy to the inductor that, in turn, provides power to the dynamic load.

The inductor current $i_L$ (such as respective current provided by a power converter phase) is sensed by the monitor circuit 245 (gain $R_i$) and is compared to the current reference $I_{ref}$ as produced by voltage reference generator 235-1. When the inductor current reaches the set peak current as specified by reference $I_{ref}$, the digital controller circuitry 100 initiates turning OFF high side switch M1 and turning ON of low side switch M2 via the digital pulse width modulation circuit 230 and respective switch drivers.

In one embodiment, the following assumptions are made to simplify the analysis of the steady state:
1) The clock works as the operating clock for both target FPGA and voltage reference generator 235 (e.g., two DACs);
2) There can be four clock periods in one power supply switching cycle;
3) The output voltage ripple of the output voltage 180 can be neglected to simplify the analysis;
4) Circuit delay is assumed to be zero.

The steady state operation of the power supply can be explained as follows: Before t0, the power supply circuit operates in the steady state. Time t0 represents the rise edge of the first clock in one switching cycle. At such time, the digital controller circuitry 100 turns ON switch M1 and turns OFF switch M2 via signals generated by the digital pulse width modulation 230 and respective driver. When the high side switch M1 is ON, the inductor current $i_L$ increases linearly.

At time t1, the sensed inductor current $i_L$ reaches to the peak current reference $I_{ref}$, the logic comparison result CI produced by comparator 240-1 shown in FIG. 2 will be set the high level, logic 1'. In accordance with such a condition, the switch M1 is turned off and the switch M2 is turned on. The inductor current $i_L$ decreases linearly because the high side switch is in an OFF state.

During the first clock period between time t1 and t2 the voltage reference $V_{ref}$ is larger than the output voltage $V_o$, and the logic comparison result CV is set to a low level, logic '0'. As a result, at time t2, such as the rising edge of the second clock in the first switching cycle, thus, the voltage reference $V_{ref}$ decreases by a small amount $\Delta V_{ref}$ and the peak current reference $I_{ref}$ increases by a small amount $\Delta I_{ref}$. During the second clock such as the period following time t3, the voltage reference $V_{ref}$ is smaller than the output voltage $V_o$, thus the logic comparison result CV becomes the high level, logic '1'.

As a result, at time t3, the rise edge of the third clock of the first switching cycle, the voltage reference $V_{ref}$ increases by a small amount $\Delta V_{ref}$ and the peak current reference $I_{ref}$ will decrease by a small amount $\Delta I_{ref}$. Both voltage reference $V_{ref}$ and the current reference $I_{ref}$ vary by steps ($\Delta V_{ref}$ and $\Delta I_{ref}$) according to the logic comparison result CV in the previous clock period, and so on.

Time t4 marks a beginning of a new (or second) switching cycle.

The timing diagram of FIG. 3 illustrates that the voltage reference and the current reference vary over time.

For example, in the steady state mode, the average output voltage $V_o$ tracks the average voltage reference $<V_{ref}>$, while the error between them is within $\Delta V_{ref}$. If $\Delta V_{ref}$ is smaller than the voltage ripple $\Delta V_{p-p}$, the voltage reference also will reflect the shape of the voltage ripple. In other words, the voltage reference generator 235-2 modifies the reference voltage, Vref, by a step amount each clock cycle so that it tracks the output voltage 180.

On the other hand, the digital controller circuitry 100 controls the peak inductor current $I_{pk}$ based on peak current reference $I_{ref}$. For the buck converter in a continuous current mode (CCM), the average inductor current $<I_L>$ can be estimated as:

$$I_o = (<I_L>) = I_{pk} - \frac{\Delta I}{2} = I_{pk} - \frac{V_o \cdot (1-D) \cdot T_{sw}}{2L_f} \quad \text{(equation 6)}$$

where D is the duty cycle ratio, $T_{sw}$ is the switching period, and $\Delta I$ is the current ripple amplitude.

For a given design, which is assumed to have constant input voltage and output voltage, the duty cycle D is constant, therefore, we will have:

$$\Delta I_o = (\Delta <I_L>) = \Delta I_{pk} = (\Delta <I_{ref}>) = \Delta I_{ref} \quad \text{(equation 7)}$$

$$\Delta V_o = (\Delta <V_o>) = (\Delta <V_{ref}>) = \Delta V_{ref} \quad \text{(equation 8)}$$

$$\Delta I_{ref} = M \frac{I_{refmax}}{2^m} \quad \text{(equation 9)}$$

$$\Delta V_{ref} = N \frac{\Delta V_{tol}}{2^n} \quad \text{(equation 10)}$$

where, $\Delta I_{ref}$ is the predefined adjustment step of the peak current reference $I_{ref}$, which is M times least significant bit (LSB) of the current DAC in voltage reference generator 235-1 (m bits, DACIref), and $\Delta V_{ref}$ is the predefined adjustment step value for the voltage reference $V_{ref}$, which is N times the least significant bit (LSB) of the voltage DAC in voltage reference generator 235-2 (n bits, DACVref), and $\Delta V_{tol}$ is the maximum allowed voltage tolerance.

As previously discussed, the digital controller circuitry 100 controls the reference voltages produced by the voltage reference generators 235 so that the power supply circuit has a controlled output impedance.

Figure 4:
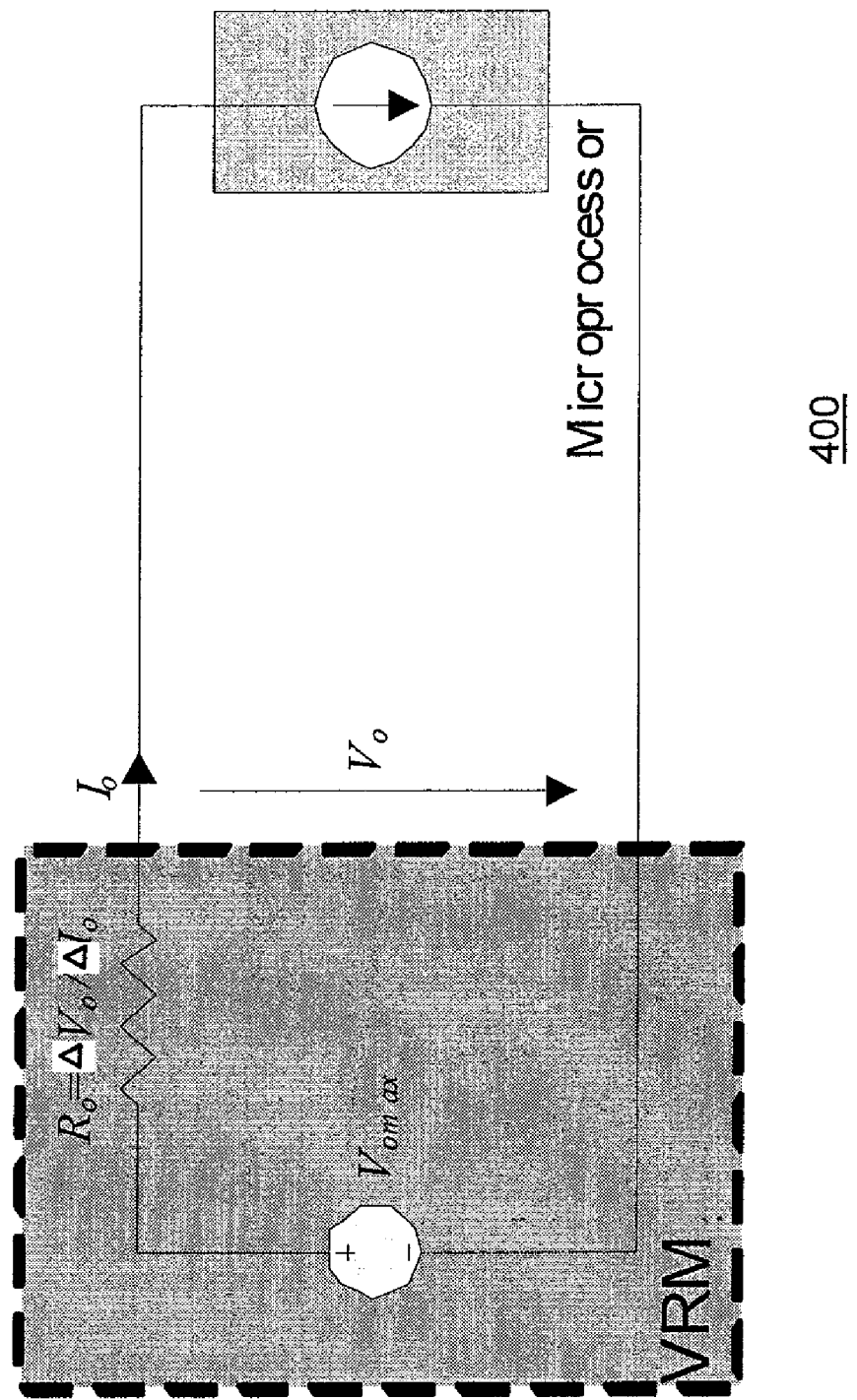
FIG. 4 is an example diagram illustrating a power supply model mode according to embodiments herein.

FIG. 4 is an example diagram illustrating a power supply system 400 according to embodiments herein.

According to control law described above, when the output current $I_o$ increases by $\Delta I_o$, the output voltage $V_o$ decreases by $\Delta V_o$, and vice versa. During no load ($I_o$), the output voltage $V_o$ will have its largest value (assume this value to be $V_{omax}$). So, the buck converter with proposed digital controller circuitry can be modeled as an ideal voltage source $V_{omax}$ in series with an equivalent resistor $R_o$.

As shown in FIG. 4, $R_o$ can be approximated as:

$$R_o = \frac{\Delta V_o}{\Delta I_o} = \frac{\Delta V_{ref}}{\Delta I_{ref}} = \frac{\Delta V_{tol}}{I_{refmax}} \cdot \frac{N}{M} \cdot 2^{m-n} \quad \text{(equation 11)}$$

As previously discussed, a substantially constant output impedance $R_o$ can be achieved with this proposed digital controller circuitry 100, independent of the equivalent series resistance ESR of the output capacitor $C_f$. From the equivalent circuit, we can conclude that:

$$V_o = V_{o\,max} - I_o \cdot R_o \quad \text{(equation 12)}$$

Therefore, an adaptive voltage position (AVP) control system can be realized. Varying the ratio N/M will adjust the output impedance $R_o$. Normally, to make a design simple, we will let N equal M (N=M=1).

3. Load Transient Operation

If a large load current transient happens to occur on the output voltage 180, the voltage reference and the current reference can be varied quickly enough to establish new balance so that the output voltage does not droop or overshoot. According to different application requirements, different control modes can be applied during a load transient. For example, three control modes can be utilized, which are summarized as follows:

1) Operates as in the steady state (control mode I);
2) Fast searching mode (control mode II);
3) Transient mode (control mode III)
4) Dual voltage loop control (control mode IV)

The control mode I serves a basis for other control modes. In the control mode I, there is no difference between in the transient state and in the steady state. For example, while a load transient-up occurs (such as load increases requiring more current), the voltage reference will decrease and the current reference will increase until a new steady state is established. While load transient-down occurs (such as the load decreasing requiring less current), the voltage reference will increase and the current reference will decrease, until a new steady state is established. In this control mode, there is no need to judge whether it is in the transient state or not. A high operating clock frequency can be utilized to achieve a fast transient response speed so that even minor changes in current consumption by the load can be provided before the output voltage falls outside of an operating range.

Control mode II can support fast searching and faster power supply response. For example, a control law can be implemented to judge whether the dynamic load experiences a transient state or not. In one embodiment, a counter TU (as discussed below in FIG. 7) can be used to count a number of times of decreasing the voltage reference produced by voltage reference generator 235-2 as it tracks or attempts to rack the output voltage 180. Another counter (counter TD) keeps track of a number of times the voltage reference produced by voltage reference generator 235-2 is increased.

If counter TU reaches a certain number (predefined in the program), this indicates a load transient-up transient condition when the load requires more current. If counter TD reaches a certain number (predefined in the program), it will judge that there is a load transient-down.

During a transient condition, a size of the adjustment steps for the voltage/current references can be increased in size than the step size used in the steady state. When implementing larger step sizes, the voltage reference and the current reference will reach the new balance value more quickly than when the step sizes are smaller. Implementing the larger sized steps to adjust the voltage references produced by the voltage reference generator 235 increases a responsiveness of the power supply and its ability to supply an appropriate amount of current to the load.

Control mode I and II operate in a manner as discussed above. However, control mode II implements larger sized step voltage adjustments to the reference voltages produced by voltage reference generators 235.

In the control mode III (such as transient mode), the control unit judges when a larger sized transient condition occurs that cannot be handled by control modes I and II. A non-linear control can be implemented by the digital controller circuitry 100 when in this transient mode. In the steady state or low transient state for modes I and II, the peak current mode control (linear control) is applied as discussed above. But in the transient mode, the peak current mode control can be disabled and the adjustment step of the voltage/current reference will increase to a larger amount (predefined) than in the normal operation.

Control mode III can provide very fast load transient speed to manage the transient condition, especially in the multi-phase VRMs in which respective high side switch in multiple power converter phases can be activated simultaneously to account for the transient condition. More specifically, in the multi-phase VRM, during a load transient-up condition, all high-side switches can be closed and all low-side switches can be opened. During a load transient-down condition, all high-side switches can be opened and all low-side switches can be closed or opened. Therefore, the control mode III has the faster load transient speed than the control mode II or control mode I.

In control mode IV, two voltage loops can be utilized to smooth load-transient transition. One is a slow voltage loop, the other one is a fast voltage loop. A dedicated transient detection circuit is added to detect the transient state of the dynamic load being powered.

As will be discussed later in this specification, control mode IV includes three modes: Normal Operation Mode, Transient Mode, and Link Mode. For example, in one embodiment, a peak current mode control is utilized in the Normal Operation Mode and Link Mode. The slow voltage loop is closed in the Normal Operation Mode, but the fast voltage loop is closed in the Link Mode. Non-Linear control is used in the Transient Mode, while peak current mode control is disabled. The Link Mode enables the power supply to make a smooth transient from one mode to another.

Figure 5:
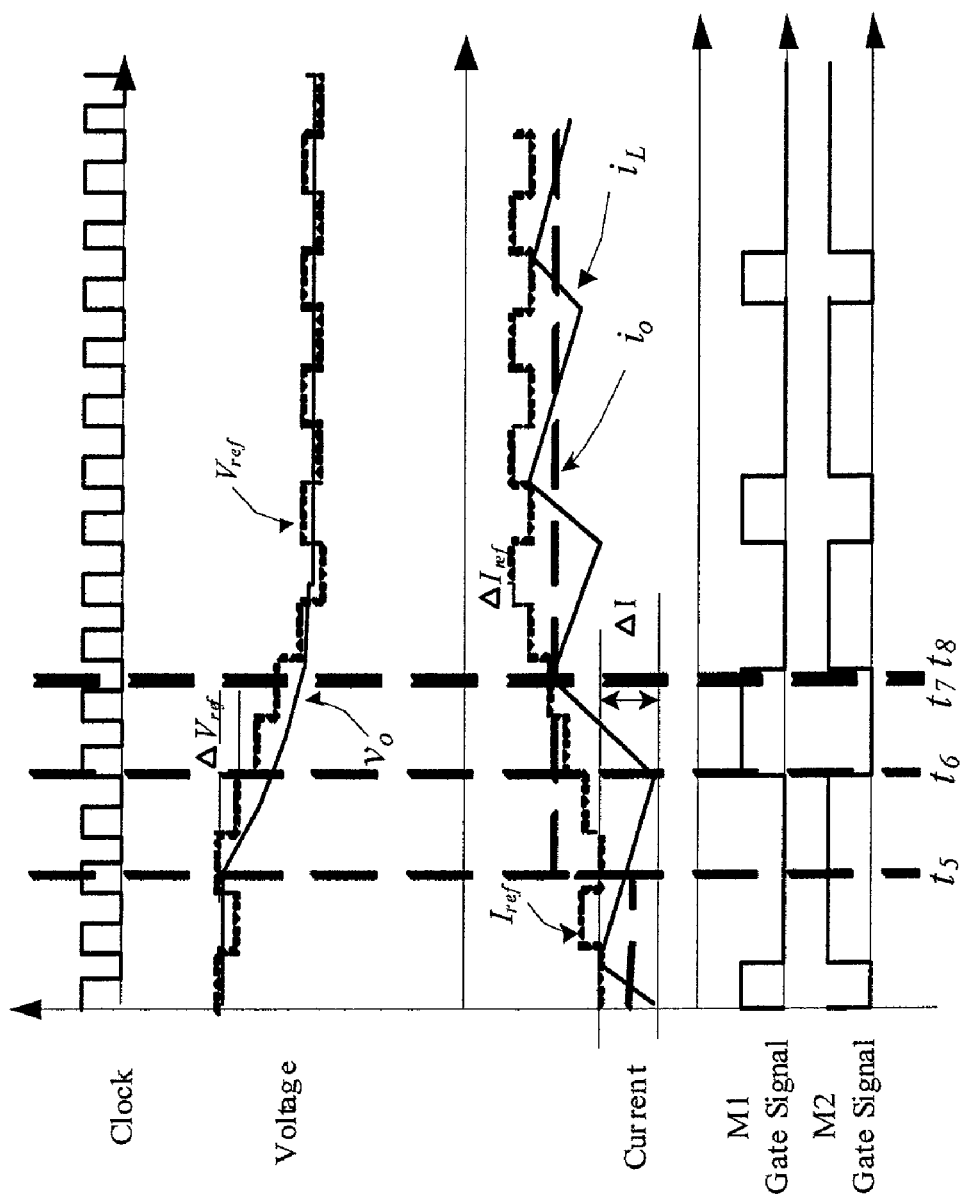
FIGS. 5 and 6 are example timing diagrams according to embodiments herein.

FIG. 5 is an example timing diagram illustrating detection of a transient condition and power supply control according to embodiments herein. At time t5, a so-called load transient-up occurs in which the dynamic load consumes more current or power. The output voltage $V_o$ starts to drop as a result of the increased load condition. The digital controller circuitry can operate in control mode I or control mode II to account for the transient condition.

Because of the excess current required by dynamic load, the output voltage $V_o$ is smaller than the voltage reference $V_{ref}$. Based on the applied control law, the voltage reference $V_{ref}$ is decreased by a small amount $\Delta V_{ref}$ step by step and the peak current reference $I_{ref}$ will increase by a corresponding small amount $\Delta I_{ref}$ step by step. Because the output voltage is less than Vref for a number of rising edges of the clock, the digital controller circuitry 100 initiates decreasing the adaptive output voltage reference value Vref for each of multiple successive sample times in which the reference voltage, Vref, is compared to the output voltage 180.

But suppose that the inductor current $i_L$ continues to decrease even after adjusting the reference voltage over multiple cycles. At time t6, the digital controller circuitry 100 initiates turning switch M1 ON and turning switch M2 off as scheduled by the digital pulse width modulation circuit 230. Then the inductor current begins to increase. At time t7, the inductor current reaches a value currently consumed by the dynamic load. At time t8, the switch M1 is turned off and the switch M2 is turned on by the comparison logic CI. Thereafter, the digital controller circuitry establishes a new steady state.

Figure 6:
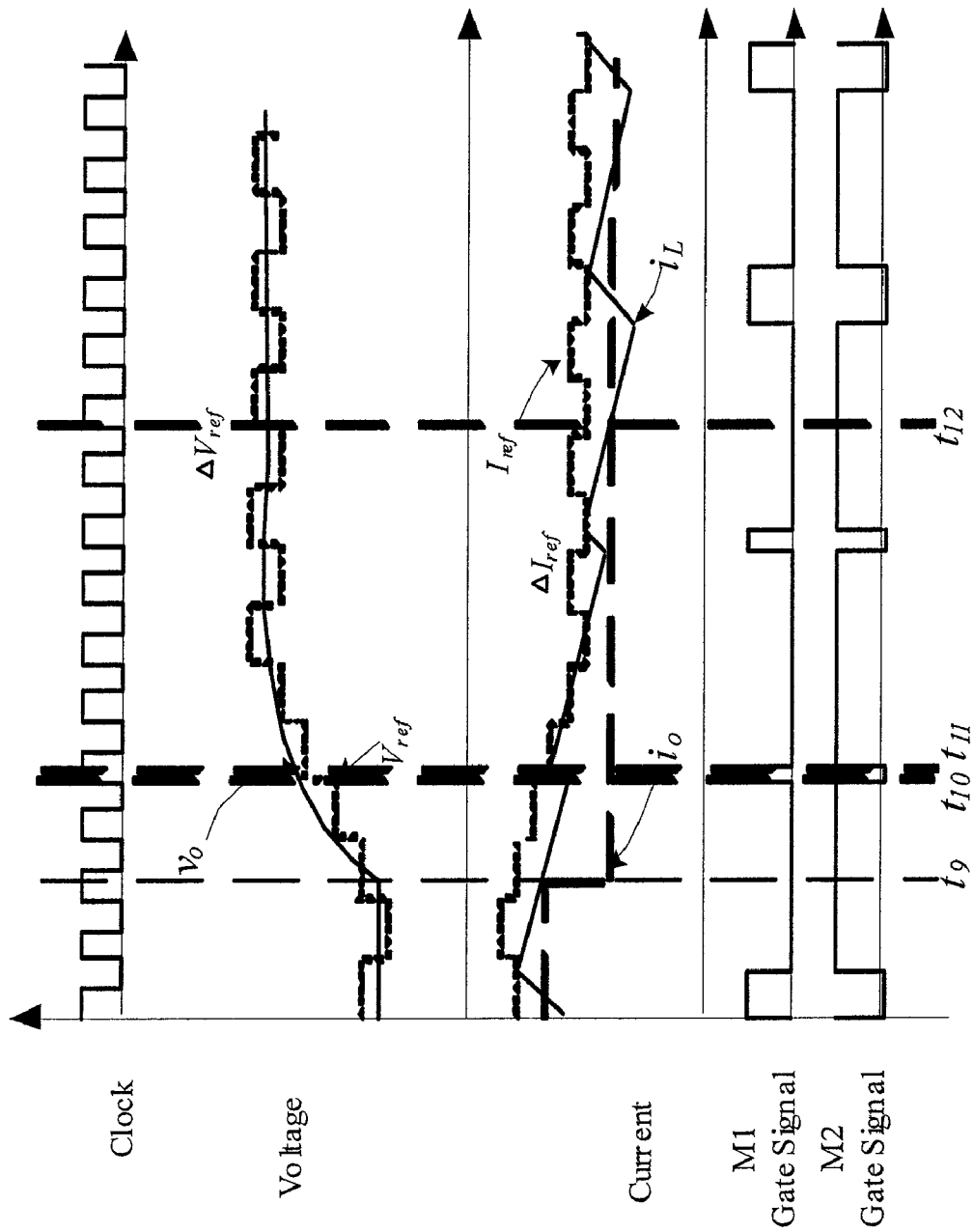

FIG. 6 is an example diagram illustrating a sample waveform illustrating a transient down condition according to embodiments herein.

At time t9, the load transient-down occurs, and the output voltage $v_o$ begins to rise accordingly because the load consumes less power, current, etc. The output voltage $v_o$ (i.e., output voltage 180) is larger than the voltage reference $V_{ref}$. Based on implementing the control law, the digital controller circuitry 100 increases voltage reference $V_{ref}$ by a small step amount $\Delta V_{ref}$ on a step-by-step basis.

As shown, the digital controller circuitry 100 decreases the peak current reference $I_{ref}$ by a small amount $\Delta I_{ref}$ on a step-by-step basis. The inductor current $i_L$ continues to decrease. At time t10, the switch M1 is turned on and the switch M2 is turned off as scheduled by the pulse width modulation circuit 230 if the inductor current $i_L$ is smaller than the peak current reference $I_{ref}$. In such a state, the inductor current begins to increase. At time t11, the switch M1 is turned off and the switch M2 is turned on by the comparison logic CI. And the inductor current begins to decrease. At time t12, the inductor current reaches its new load current, which becomes the steady state.

If the operating clock $f_{clk}$ of the target FPGA and D/A Converters is high enough, very fast load transient speed can be achieved. Only the inductance ($L_f$) will impact the inductor current transient speed if the operating clock $f_{clk}$ meets the following conditions:

$$\text{Load transient-up: } f_{clk} \cdot \Delta I_{ref} > \frac{V_{in} - V_o}{L_f} \quad \text{(equation 13)}$$

$$\text{Load transient-down: } f_{clk} \cdot \Delta I_{ref} > \frac{V_o}{L_f} \quad \text{(equation 14)}$$

where, $\Delta I_{ref}$ is defined in equation (9). In this control mode, normally, M is set to be 1, to take advantage of the full range of the current-based digital to analog converter in voltage reference generator 235-1.

Control Mode II

In this control mode, a control unit is used to determine the operation state of the voltage regulator module. The typical operation waveforms are similar to those as discussed above with respect to control mode I. However, the reference adjustment step amounts ($\Delta V_{ref}$ and $\Delta I_{ref}$) in the transient-state stage can be set to a larger step amount than the step amount implemented in control mode I.

A relatively low frequency may be chosen for the operating clock. A counter TU can be used to count the number of step decreases associated with the voltage reference. Another counter TD can be used to count the number of step increases associated with the voltage reference. If counter TU reaches a threshold value or limitation value (LMT_TU, predefined in the program), the digital controller circuitry 100 detects a load transient-up condition in which the dynamic load consumes more current than the power supply is able to instantly supply for control mode I. If counter TD reaches the limitation value (LMT_TD, predefined in the program), it will judge that there is a load transient-down. The threshold values can be determined as follow:

$$\text{LMT\_TU} \geq \min\left\{\text{int}\left[\frac{f_{clk}}{2f_{sw}}\right], \text{int}\left[\frac{\Delta V_{o,r}}{\Delta V_{ref}}\right]\right\} + 1 \quad \text{(equation 15)}$$

$$\text{LMT\_TD} \geq \min\left\{\text{int}\left[\frac{f_{clk}}{2f_{sw}}\right], \text{int}\left[\frac{\Delta V_{o,r}}{\Delta V_{ref}}\right]\right\} + 1 \quad \text{(equation 16)}$$

where, D is the duty cycle, $f_{sw}$ is the switching frequency, $f_{clk}$ is the operating clock of target FPGA and DACs, $\Delta V_{o,r}$ is the peak-to-peak output ripple voltage, int[x] is the function that takes the minimum integer larger than x, and min[x,y] is the function that takes the smaller one from x and y.

It is assumed that M=1 in equation (9) in the steady-state stage. M for the transient-state stage can be selected to achieve good dynamic performance as follows:

$$\text{Load transient-up: } M \geq \text{int}\left[\frac{V_{in} - V_o}{\Delta I_{ref} \cdot L_f \cdot f_{clk}}\right] \quad \text{(equation 17)}$$

$$\text{Load transient-down: } M \geq \text{int}\left[\frac{V_o}{\Delta I_{ref} \cdot L_f \cdot f_{clk}}\right] \quad \text{(equation 18)}$$

where, $\Delta I_{ref}$ is the adjustment amount of the current reference in the steady state, and int[x] is the function that takes the minimum integer larger than x.

If M in (9) is chosen by equations (17) and (18) for the transient-state stage, the conditions as specified by equations (13) and (14) will be always satisfied during the load transient stage.

Figure 7:
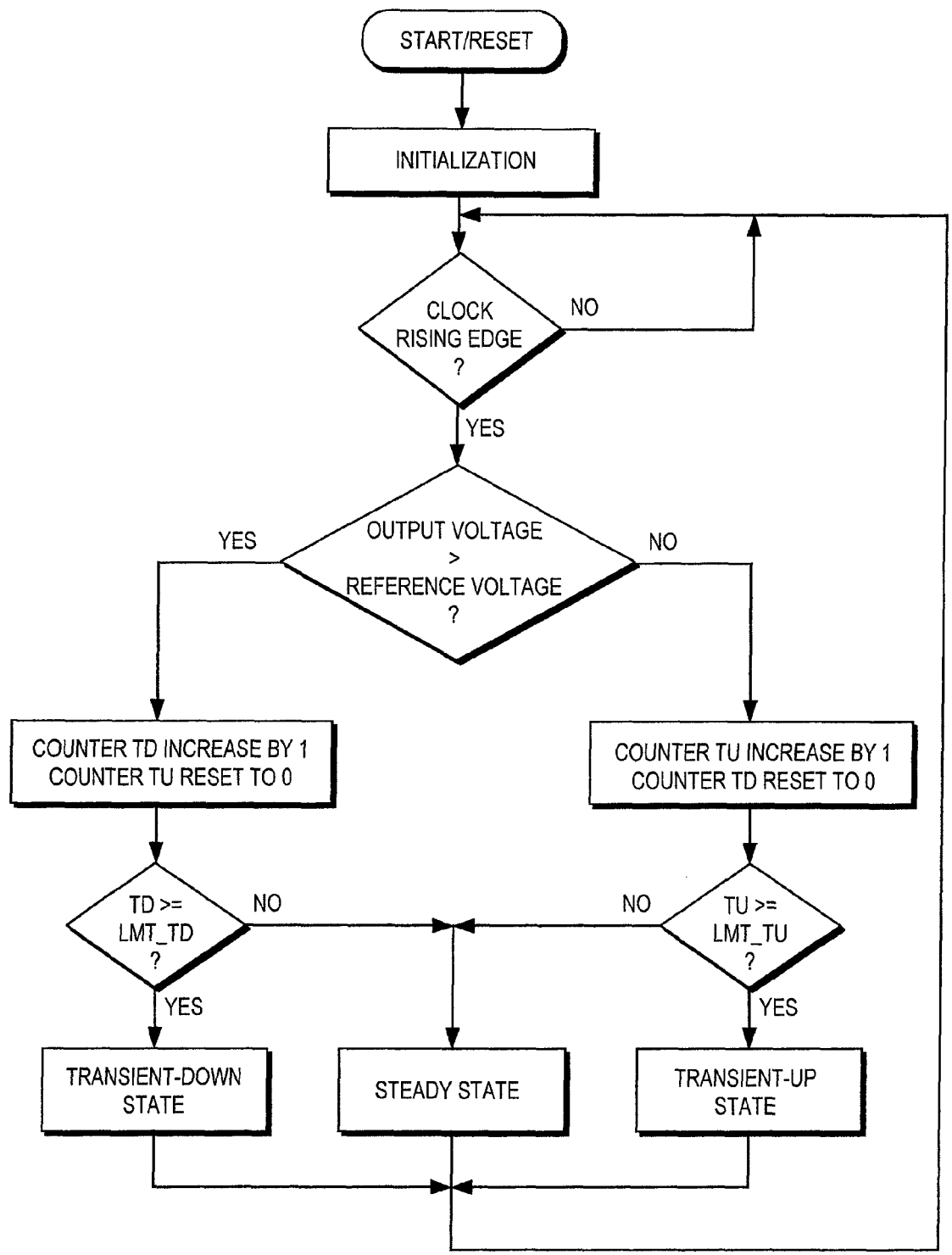
FIG. 7 is an example diagram illustrating a method for detecting a transient condition according to embodiments herein.

FIG. 7 is a diagram illustrating example processing associated with the digital controller circuitry 100 according to embodiments herein.

As shown and previously discussed, the digital controller circuitry 100 can include a pair of counters, namely, counter TD and counter TU. For each clock cycle, the digital controller circuitry 100 checks whether the output voltage 180 is greater than a current value of the reference voltage, Vref. If so the digital controller circuitry increments the TD counter and resets the TU counter to zero. Additionally, the digital controller circuitry 100 increases the reference voltage by an appropriate step amount so that the reference voltage tracks the output voltage. Conversely, if the output voltage 180 is not greater than the reference voltage for the sample cycle, the digital controller circuitry 100 increments the TU counter and resets the TD counter to zero. Additionally, the digital controller circuitry 100 decreases the reference voltage by an appropriate step amount so that the reference voltage tracks the output voltage.

During sampling, if the digital controller circuitry 100 detects that the TU counter or TD counter is less than a respective threshold value, then the digital controller circuitry 100 continues to operate in the steady state control mode (i.e., control mode I or control mode II).

If the output voltage 180 is greater than the reference voltage Vref for more than a threshold value number of consecutive cycles, then the digital controller circuitry 100 detects a transient-down condition in which the dynamic load instantaneously requires less current than provided by the power supply. Conversely, for a given sample cycle, if the output voltage 180 is less than the reference voltage Vref for more than a threshold value number of consecutive cycles, then the digital controller circuitry 100 detects a transient-up condition in which the dynamic load instantaneously requires more current than provided by the power supply. The digital controller circuitry 100 can identify a transient condition such as by monitoring a change in output current or output voltage over time, monitoring a level of the output voltage, etc.

Control Mode III

A control function for judging whether a transient state exists or not also can be implemented in control mode III. The process of the mode control function in this mode can be the same as that of control mode I or II, as previously discussed with respect to FIG. 7. In one embodiment, while in control mode III, the digital controller circuitry 100 operates in a non-linear mode.

Figure 8:
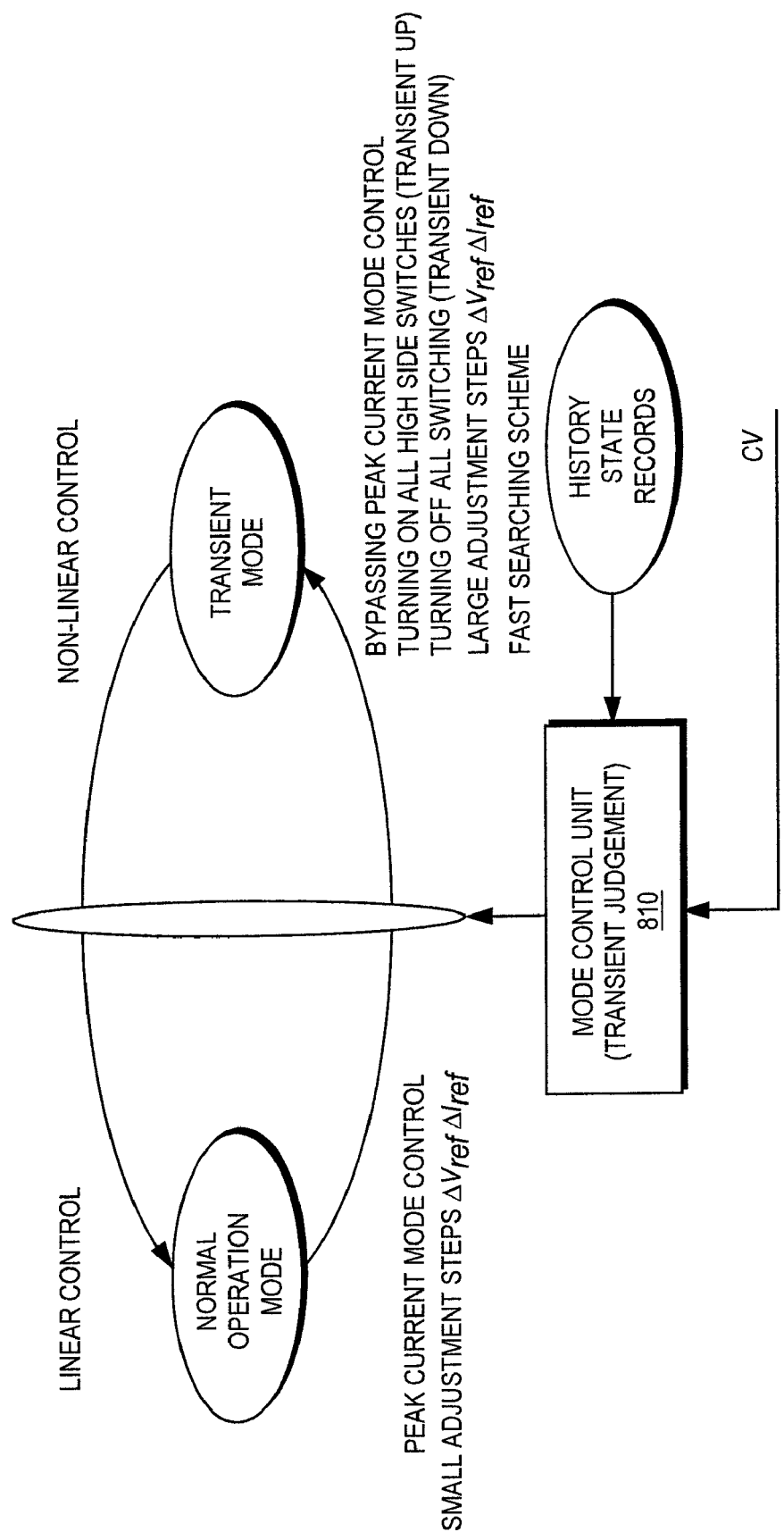
FIG. 8 is an example diagram illustrating mode transitions according to embodiments herein.

FIG. 8 is an example diagram illustrating different control modes according to embodiments herein. As shown, based on decision logic in the mode control unit 810, the digital controller circuitry 100 can operate in a linear control mode (e.g., a peak current control mode such as control mode I or control mode II) or a non-linear control mode (e.g., a non-peak control mode).

As previously discussed, while in the steady state, the digital controller circuitry 100 implements a peak current mode control (linear control). FIG. 8 shows this as a normal operational mode when the transient conditions are relatively minimal.

When in the transient mode, such as when the dynamic load experiences a transient condition, the digital controller circuitry 100 disables the peak current mode and adjusts the adjustment step of the voltage/current reference to a larger step amount (predefined) than is implemented during the normal operation.

More specifically, during a load transient-up condition, when the dynamic load requires extra power, all high-side switches can be turned to an ON state by the digital controller circuitry 100 to account for the transient condition. The high side switches can be turned ON almost immediately to account for the sudden change in load, after which the power supply can be operated in the steady state mode or linear control mode again.

During a load transient-down condition such as when the dynamic load instantaneously consumes less power, all high switches can be turned OFF. After the transient condition, the digital controller circuitry 100 can implement the linear control mode again during steady state conditions when the power consumption does not change appreciably over time. According to one embodiment, this transient mode provides faster load transient response speed than control modes I & II. However, unlike control modes I & II, the transient mode does not operate based on a peak current mode control.

Control Mode IV

Figure 9:
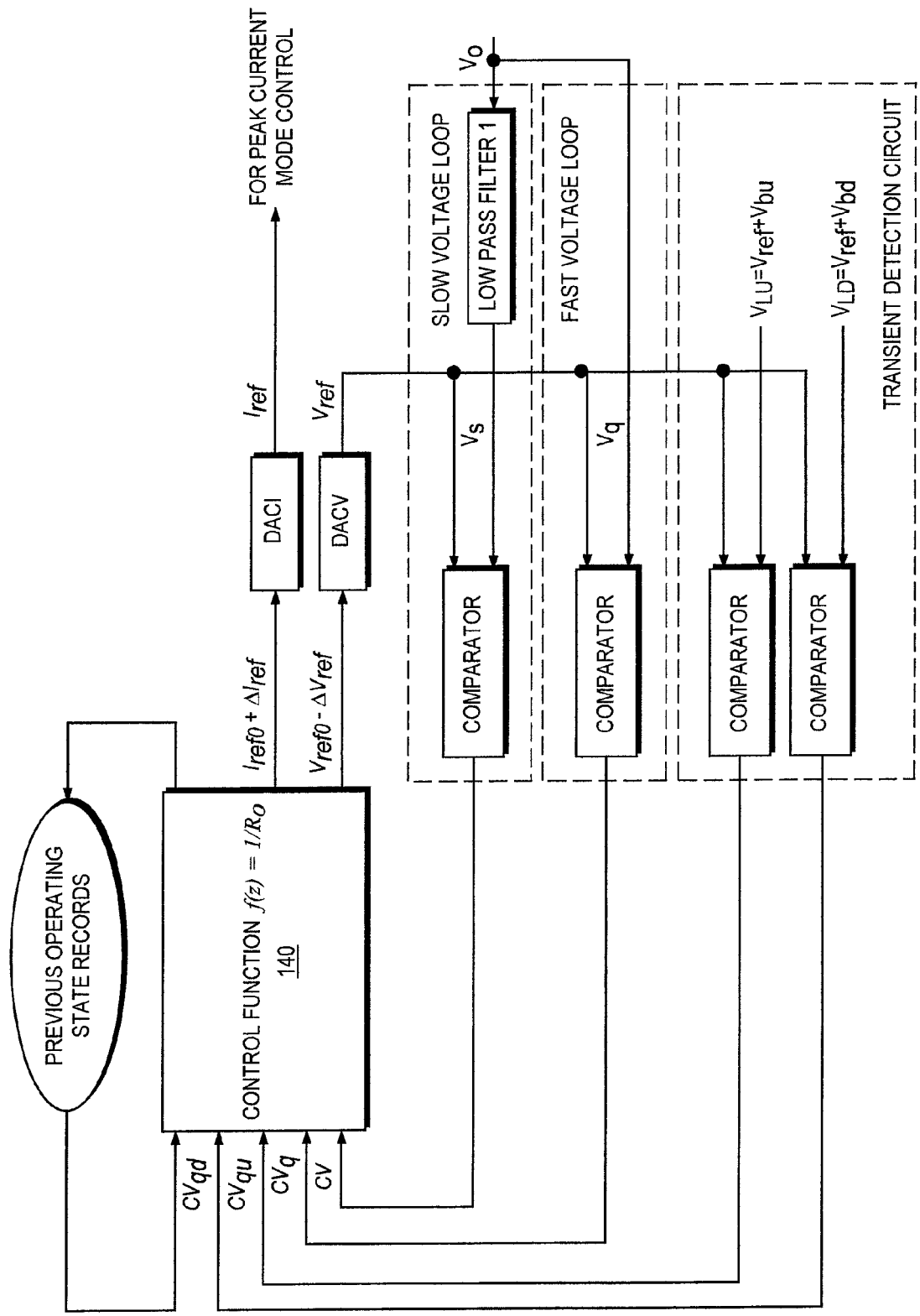
FIG. 9 is an example diagram illustrating a power supply configuration according to embodiments herein.

FIG. 9 is an example diagram illustrating a dual voltage loop control mode (such as control mode IV) according to embodiments herein. In such an embodiment, loops operate at different speeds: one voltage loop is a slow loop and the other voltage loop one is a fast loop.

One purpose of two voltage loops is to smooth the transition between the transient control mode and non-transient control modes. A dedicated load transient detection circuit 900 can be implemented to detect the transient and non-transient states, and when to switch between them.

Figure 10:
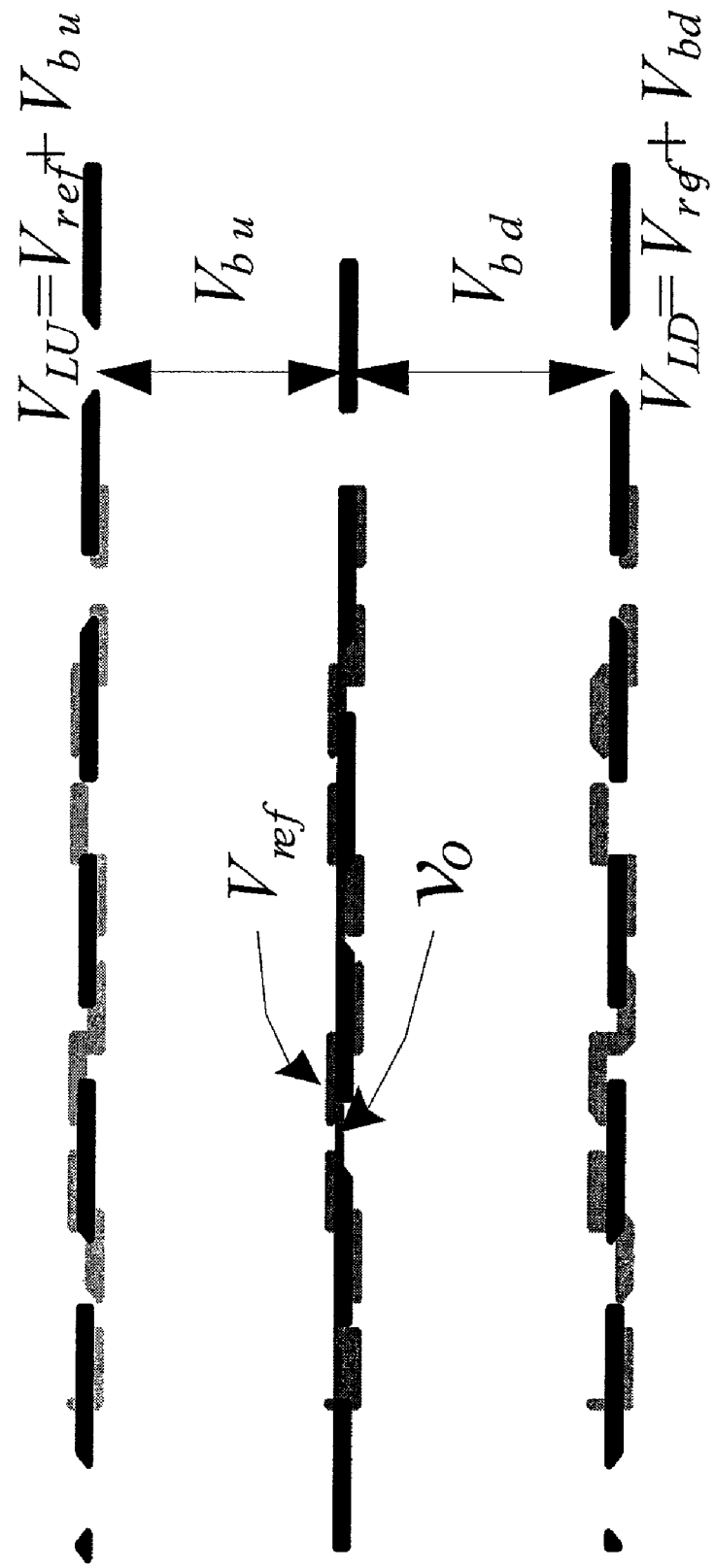
FIG. 10 is an example timing diagram according to embodiments herein.

FIG. 10 is an example diagram illustrating the voltage limitation gap for the load transient detection circuit 900 according to embodiments herein. The voltage gap follows the voltage reference $V_{ref}$. In the steady state, the voltage reference follows the output voltage Vo, which is the fed back by the slow voltage loop.

If a transient-up load occurs, the output voltage, Vq, which is fed back by the fast voltage loop will drop ahead of the output voltage Vo and the voltage reference Vref. When the output voltage Vq reaches and becomes smaller than the lower limit $V_{LD}$ of the voltage limitation gap, the transient detection circuit will assert a signal indicating the transient-up load state. In such an instance, the digital controller circuitry 100 will enter the transient (up) mode.

While in the transient-up mode, peak current mode control is disabled and non-linear control is applied so that the transient can be quickly satisfied. For example, the digital controller circuitry 100 simultaneously turns ON multiple high side switches to achieve a high inductor current slew rate. A relatively large current/voltage reference step can be used to track the new balance point.

When the output voltage Vq goes back into the voltage limitation gap, the digital controller circuitry 100 will enter the link mode. In one embodiment, the link mode provides a smooth transition from the transient mode back to the normal mode. However, when transitioning from the normal mode to the transient mode, note that it may be desirable to skip the link mode and perform a transition between the normal mode and the transient mode because the transient mode is able to more quickly provide current to the dynamic load when so needed.

While in the link mode, the fast voltage loop is closed and the slow voltage loop is open. The voltage reference Vref follows the output voltage Vq. A medium sized current/voltage reference steps can be used to track the new balance point. Peak current mode control can be implemented.

When the voltage reference crosses over the output voltage Vo again, after following the output voltage for multiple cycles, the digital controller circuitry 100 will enter the normal operation mode form the link mode. In this mode, the slow voltage loop is closed and the fast voltage loop is open. As previously discussed, the digital controller circuitry 100 can implement relatively small sized current/voltage reference step to change the reference voltages. Peak current mode is also applied.

Similarly, if a transient-down load occurs (such as the dynamic load suddenly requires less current), the output voltage Vq, which is fed back by the fast voltage loop will increase ahead of the output voltage Vo and the voltage reference Vref. When the output voltage Vq reaches and becomes larger than the upper limit $V_{LU}$ of the voltage limitation gap, the transient detection circuit 900 will assert a signal indicating load transient-down state. In such an instance, the digital controller circuitry 100 will enter the transient-down mode.

In the transient-down mode, the peak current mode control is disabled and non-linear control is applied by the digital controller circuitry 100 to control respective high and low side switches. For example, to accommodate the transient-down condition, the digital controller circuitry 100 can simultaneously activate multiple respective low side switches in multiple power converter phases of the power supply and deactivate the respective high side switches to achieve a high inductor current slew rate.

When in the transient-down mode, a relatively large current/voltage reference step can be used to track the new balance point. When the output voltage Vq eventually goes back into the voltage limitation gap, the controller will enter the link mode.

In the link mode, the fast voltage loop is closed and the slow voltage loop is open. The voltage reference Vref follows the output voltage Vq. A medium current/voltage reference step can be by the digital controller circuitry 100 to track the new balance point. A peak current mode control can be applied. When the voltage reference crosses over the output voltage Vo again, the digital controller circuitry 100 can be configured to enter the normal operation mode.

In the normal mode, the slow voltage loop is closed and the fast voltage loop is open. A small current/voltage reference step can be used. Peak current mode is also applied.

Figure 11:
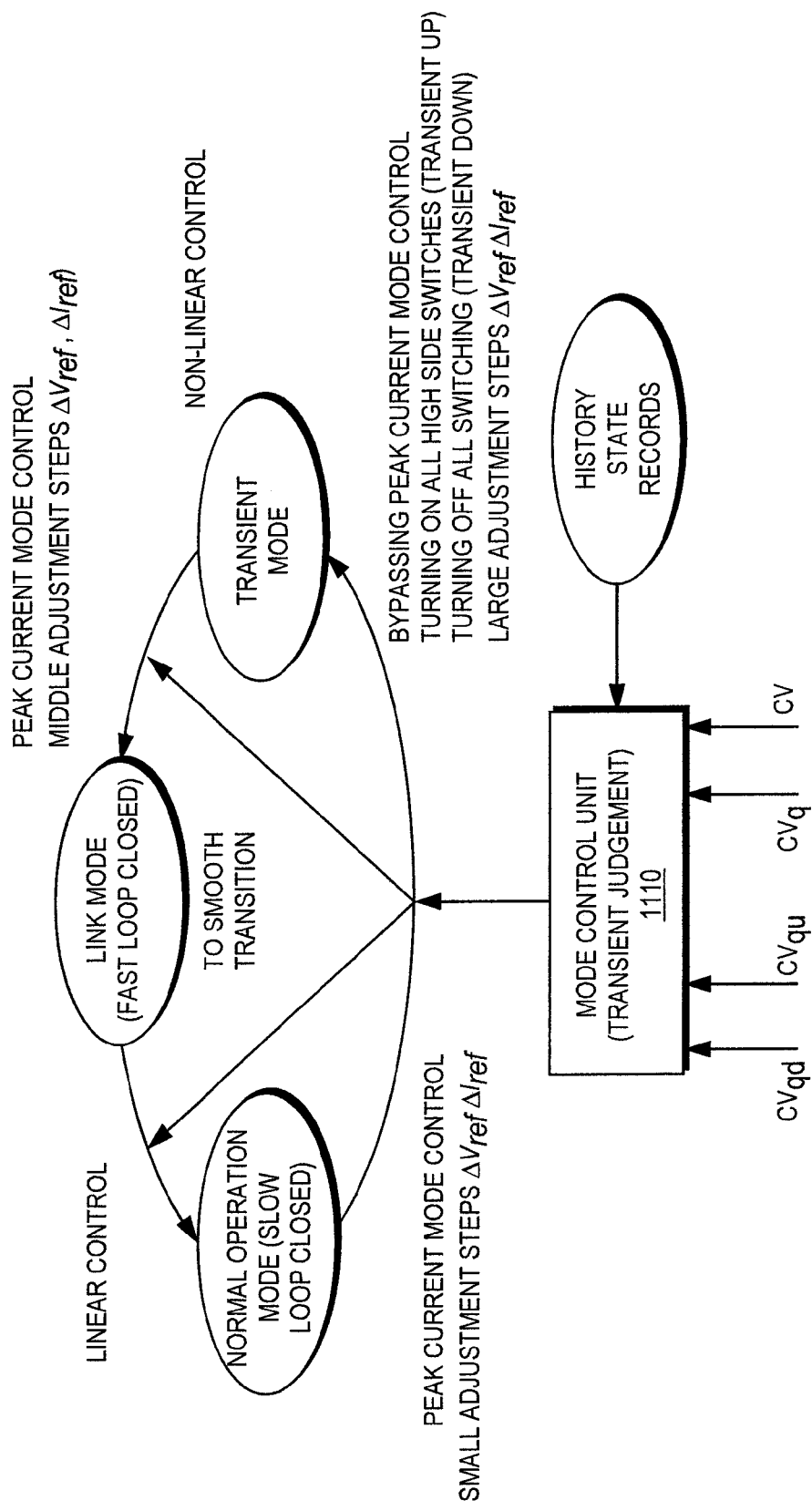
FIG. 11 is an example diagram illustrating mode transitions according to embodiments herein.

FIG. 11 is an example diagram illustrating the multiple modes and transitioning between modes according to embodiments herein. As previously discussed, the digital controller circuitry 100 can initiate transitioning between modes (such as the normal mode, transient mode, and link mode) based on the dual voltage loop control as previously discussed with respect to FIG. 10.

It should be noted that, upon detecting a higher load current transient conditions, the earlier the digital controller circuitry 100 will enter the transient mode and provide the needed higher load current slew rate. If the load current step amount is relatively low or required load current slew rate is low as previously discussed, the digital controller circuitry 100 may not enter transient mode, since the normal operation mode (fast searching mode embedded) can handle such a load transient.

Figure 12:
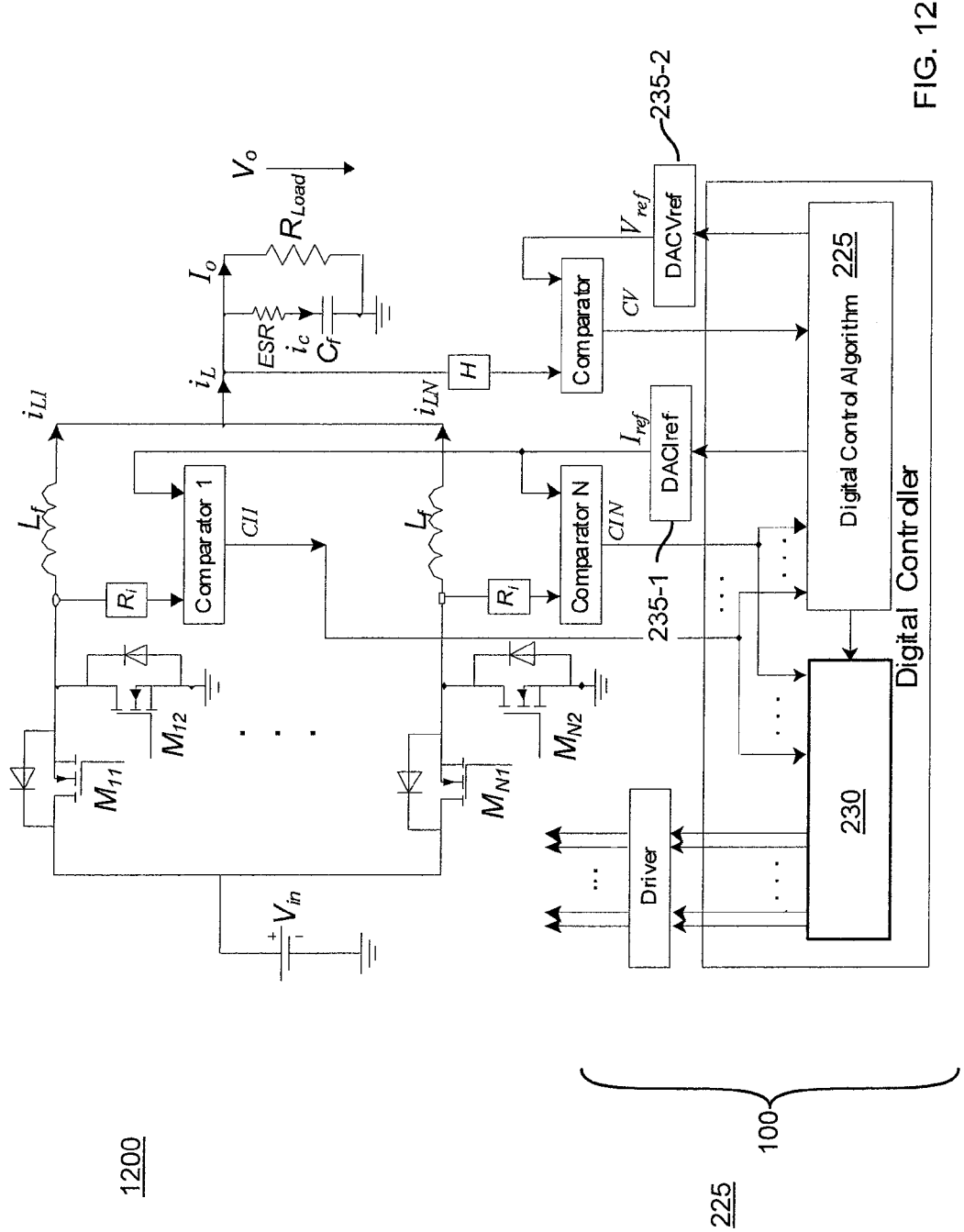
FIG. 12 is an example diagram of a power supply system including multiple power converter phases according to embodiments herein.

FIG. 12 is an example diagram illustrating a power supply including multiple power converter phases according to embodiments herein. In this example configuration, the power supply 1200 includes multiple power converter phases controlled by digital controller circuitry 100. During normal mode, the digital controller circuitry 100 operates the power converter phases out of phase. During a transient condition, the digital controller circuitry 100 can initiate simultaneous activation of multiple high side switches or multiple low side switches to account for different types of transient conditions.

Interleaving of multiple power converter phases not only reduces the current ripple in the total output currents, but also increases the total output current frequency. The ripple frequency of the total inductor currents is N times the frequency of each channel (e.g., power converter phase). Thus, use of multiple power converter phases significantly reduces the output filter capacitor requirement associated with the power supply. Similarly, the interleaving of multiple power converter phases can also significantly reduce the input filter capacitor requirement.

However, interleaving of multiple power converter phases may include a more complicated controller not only because more control signals are needed but also because of the timing and matching of control signals in different channels. According to one embodiment, the digital controller circuitry 100 implements current sharing control among the different channels (e.g., phases) to balance driving the load with multiple power converter phases or channels.

As shown, FIG. 12 shows circuit configuration of an N-phase buck converter with the proposed digital controller circuitry 100, where total (N+1) comparators are used.

One comparator is used for comparing the current associated with each power converter phase to a corresponding reference current voltage value.

Another comparator is used in the voltage loop that compares the output voltage 180 to a reference voltage value Vref.

The inductor current of each phase is sensed separately and compared to the peak current reference $I_{ref}$ produced by the voltage reference generator 235-1. The peak current reference $I_{ref}$ is set as a phase peak current reference. The logic signal of the comparator of each phase is used to turn off its own respective high side switch and turn on its own low side switch, respectively. The turn-on signal of high side switch and the turn-off signal of low side switch are generated by the pulse width modulation circuit 230. In one embodiment, the pulse width modulation circuit 230 is implemented in the counter-comparator method. For an N-phase buck converter, the counter bit n is given as:

$$n = \text{int}[\log_2 N] \quad \text{(equation 19)}$$

where function int( ) takes the upper rounded integer value of the product.

Figure 13:
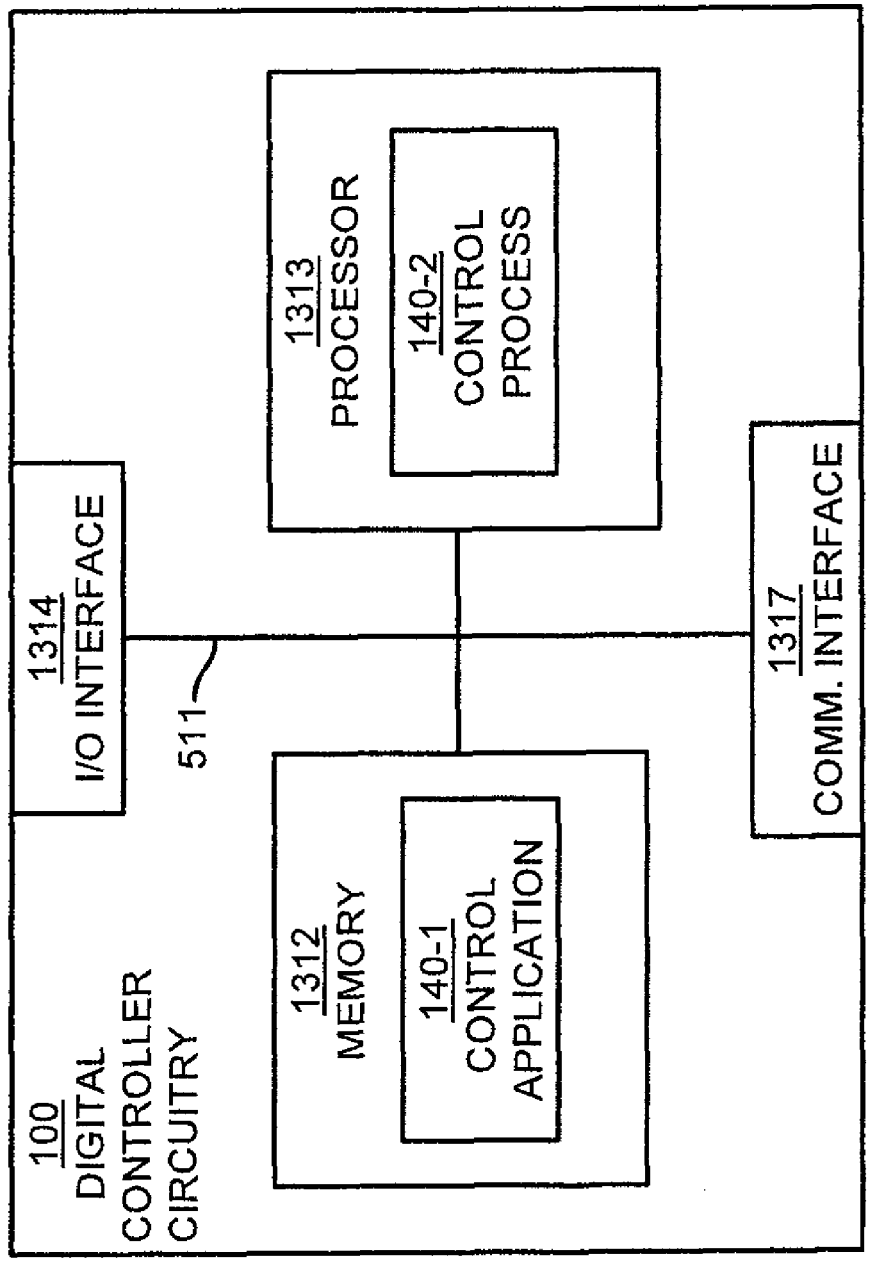
FIG. 13 is an example diagram illustrating a circuit for executing operations according to embodiments herein.

FIG. 13 is a diagram illustrating an example architecture for executing instructions, methods, techniques, etc., associated with control application 140-1 according to embodiments herein. The digital controller circuitry 100 can be configured to include a processor such as a DSP (Digital Signal Processor), FPGA (Field Programmable Gate Array), microcontroller, other related circuitry as described herein, etc., to carry out the techniques as discussed above and further below.

In such an embodiment, the control circuit 140 can include an interconnect 1311 that couples a memory system 1312, a processor 1313, an input/output interface 1314, and a communication interface 1317.

The memory system can be encoded with a control application 140-1 that enables the processor to support generation of appropriate data, control, and communication signal(s) to regulate output voltage 180 via one or more voltage converter phases. Accordingly, a corresponding control application 140-1 can be embodied as software code such as data and/or logic instructions (e.g., code stored in the memory or on another computer readable medium such as a disk) that supports processing functionality according to different embodiments described herein.

During operation according to one embodiment, the processor 1313 accesses the memory system 1312 via the use of interconnect 1311 in order to launch, run, execute, interpret or otherwise perform the logic instructions of the control application 140-1. Execution of the control application produces processing functionality in control process 140-2. In other words, the control process 140-2 represents one or more portions of the control application 140-1 performing within or upon the processor 1313.

It should be noted that, in addition to the control process that carries out example method operations as discussed herein, other embodiments herein include the control application 140-1 itself such as the un-executed or non-performing logic instructions and/or data for producing control signal(s) to control each of one or more voltage converter phases, voltage reference generators, etc., in the power supply system.

The control application 140-1 may be stored on a computer readable medium (e.g., a repository) such as a floppy disk, hard disk or in an optical medium. According to other embodiments, the control application 140-1 can also be stored in a memory type system such as in firmware, read only memory (ROM), or, as in this example, as executable code within the memory system (e.g., within Random Access Memory or RAM), etc.

Note that in other example embodiments, any portion of the digital controller circuitry 100 can be configured as hardware such as combinatorial logic, digital circuits, etc.

Functionality supported by digital controller circuitry 100 and related circuits will now be discussed via flowcharts in respective FIGS. 14 through 17. Note that there will be some overlap with respect to concepts discussed above. Also, note that the steps in the below flowcharts need not always be executed in the order shown.

Figure 14:
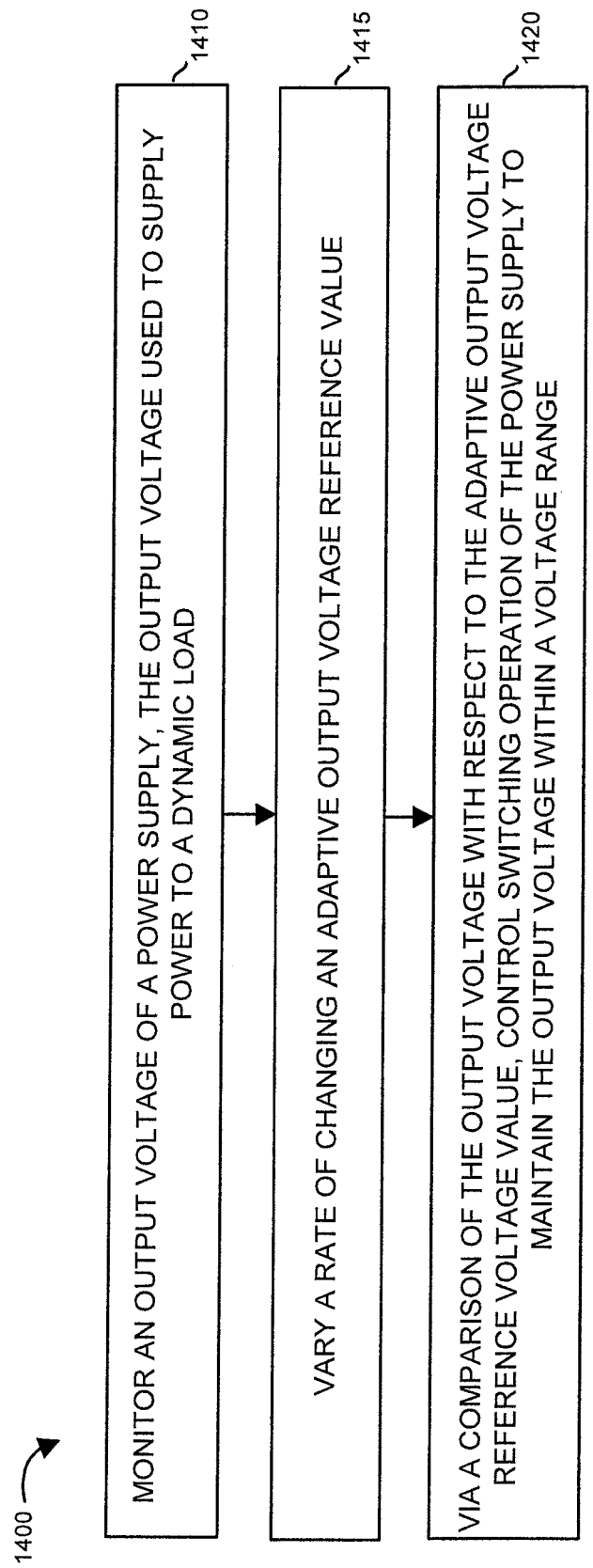
FIGS. 14 through 17 are example flowcharts illustrating example methods according to embodiments herein.

More specifically, FIG. 14 is a flowchart 1400 illustrating a technique of improving power supply efficiency according to embodiments herein.

In step 1410, the digital controller circuitry 100 monitors an output voltage 180 of the power supply. As previously discussed, the output voltage 180 is used to supply power to a dynamic load such as $R_{LOAD}$.

In step 1420, the digital controller circuitry 100 varies a rate of changing the adaptive output voltage reference value (such as Vref) as produced by the voltage reference generator 235-2.

In step 1430, the digital controller circuitry 100 compares the output voltage 180 with the adaptive output voltage reference voltage value. Based on the comparison, the digital controller circuitry 100 controls switching operation of the power supply to maintain the output voltage 180 within a voltage range.

Figure 15:
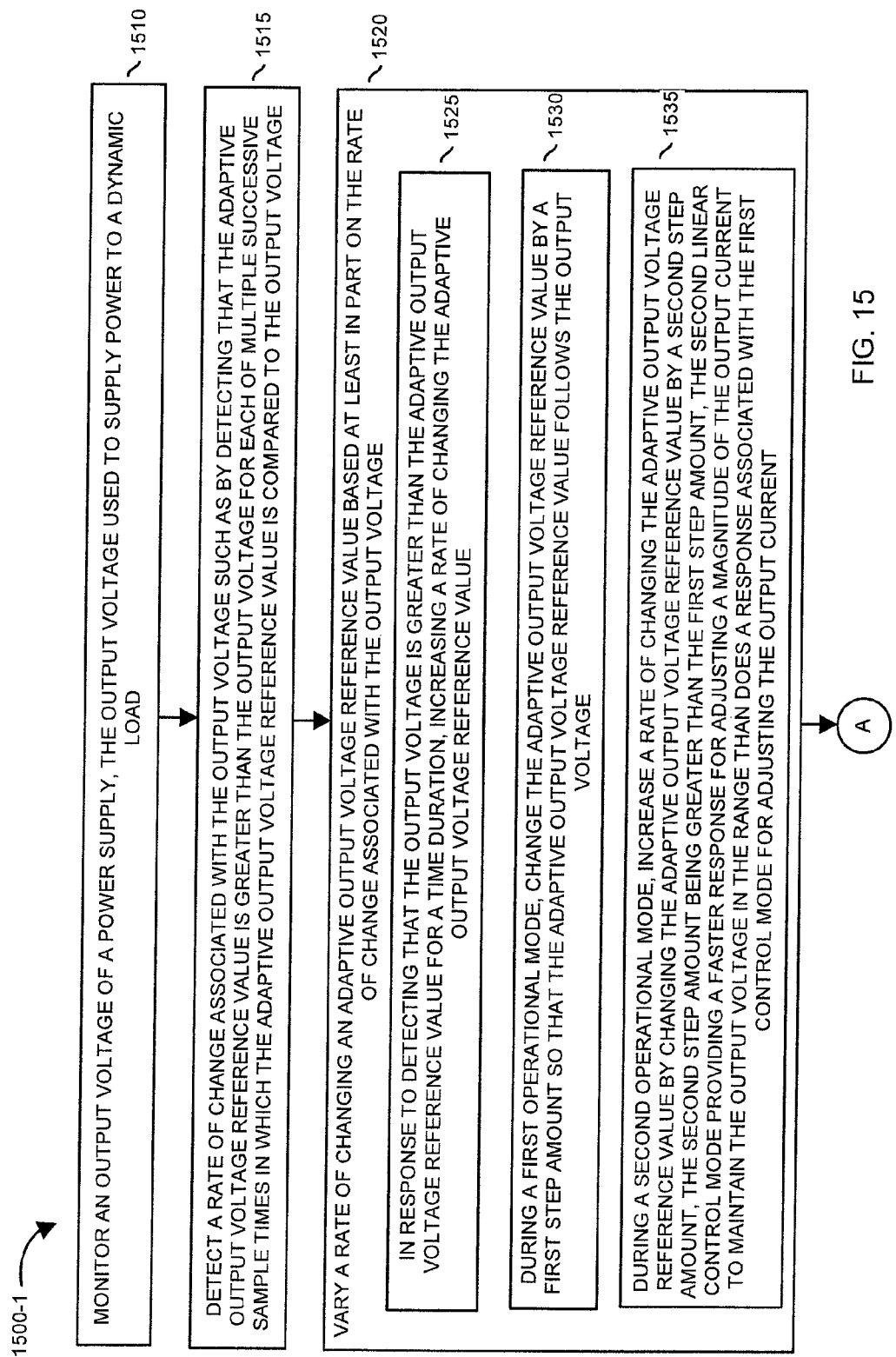
Figure 16:
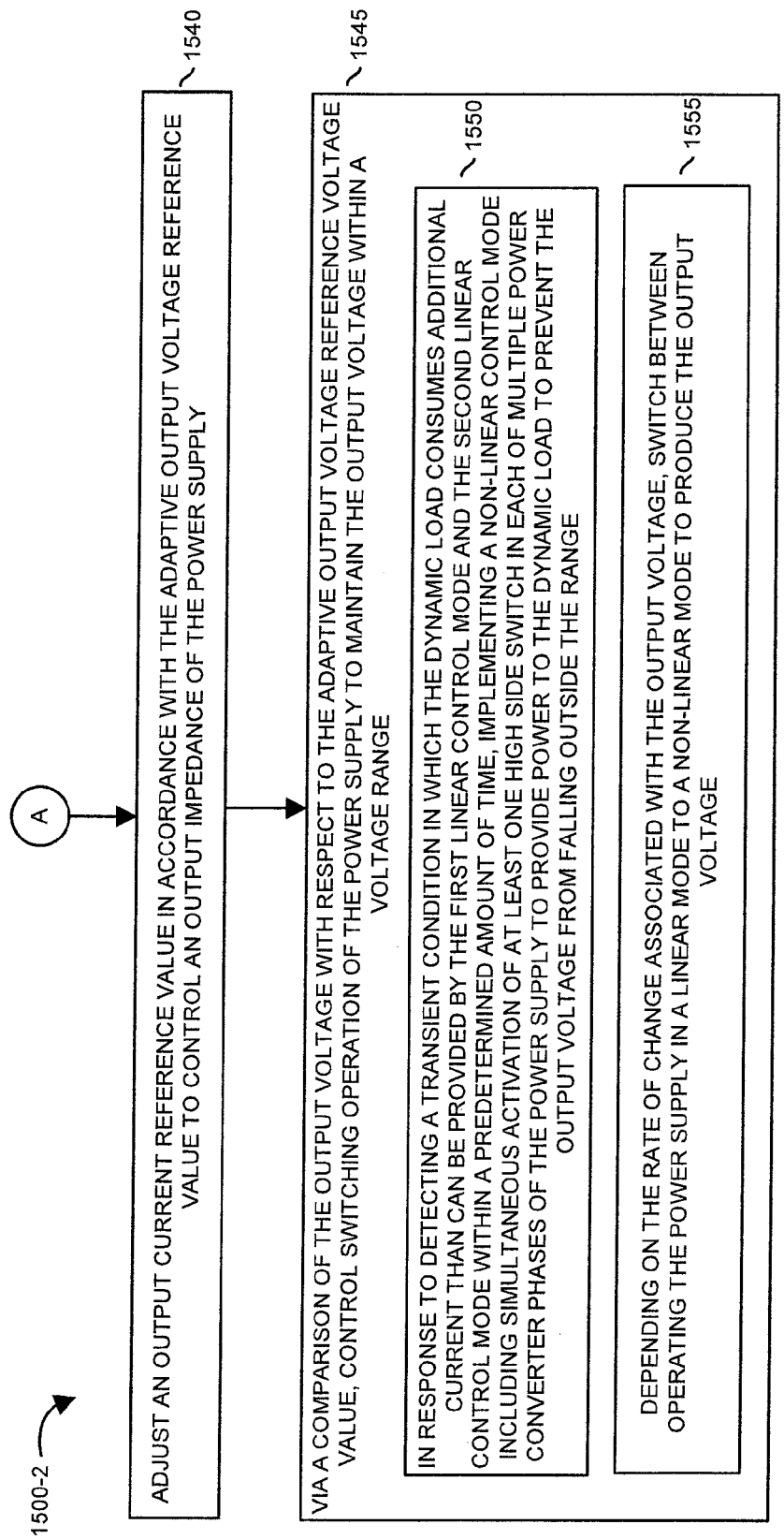

FIGS. 15 and 16 combine to form a flowchart 1500 (e.g., flowchart 1500-1 and flowchart 1500-2) illustrating a technique of improving power supply responsiveness based at least in part on switching between different operational modes according to embodiments herein.

In step 1510, the digital controller circuitry 100 monitors an output voltage 180 of a respective power supply. As previously discussed, the output voltage 180 can be used to supply power to a dynamic load ($R_{LOAD}$) such as a processor device or other circuit that consumes different amounts of power over time.

In step 1515, the digital controller circuitry 100 monitors the output voltage 180 and detects a rate of change associated with the output voltage 180 such as by detecting that the adaptive output voltage reference value, Vref, is greater than the output voltage 180 for each of multiple successive sample times in which the adaptive output voltage reference value is compared to the output voltage 180.

In step 1520, the digital controller circuitry 100 varies the rate of changing the adaptive output voltage reference value (i.e., Vref) based at least in part on the rate of change associated with the output voltage 180. In other words, if the output voltage 180 changes quickly such that small step changes in the adaptive output voltage reference value cannot catch up to the output voltage 180, then the digital controller circuitry 100 implements larger step sizes, thus, increasing a responsiveness of the power supply to supply power to the dynamic load. Thus, a mode setting of the power supply reflects what is current needed to supply an appropriate amount of current to the load.

In sub-step 1525, in response to detecting that the output voltage 180 is greater than the adaptive output voltage reference value Vref for a time duration, the digital controller circuitry 100 increases a rate of changing the adaptive output voltage reference value so that Vref changes more quickly over time.

In sub-step 1530, during a first operational mode, the digital controller circuitry 100 changes the adaptive output voltage reference value Vref by a first step amount so that the adaptive output voltage reference value follows the output voltage 180.

In step 1535, during a second operational mode, the digital controller circuitry 100 increases a rate of changing the adaptive output voltage reference value by changing the adaptive output voltage reference value Vref by a second step amount. The second step amount is greater than the first step amount. The second linear control mode provides a faster response for adjusting a magnitude of the output current to maintain the output voltage in the range than does a response associated with the first control mode for adjusting the output current. Accordingly, the second mode is more responsive to supplying power to the dynamic load.

In step 1540, the digital controller circuitry 100 adjusts an output current reference value (Iref signal produced by voltage reference generator 235-1) in accordance with the adaptive output voltage reference value (Vref signal as produced by voltage reference generator 235-2) to control an output impedance of the power supply.

In step 1545, via a comparison of the output voltage 180 with respect to the adaptive output voltage reference voltage value and comparison of the supplied current compared to the adaptive output current reference value, the digital controller circuitry 100 control switching operation of the power supply to maintain the output voltage 180 within a voltage range as previously discussed using the voltage and current control loops.

In step 1550, in response to detecting a transient condition in which the dynamic load consumes additional current than can be provided by the first linear control mode and the second linear control mode within a predetermined amount of time, the digital controller circuitry 100 operations in a non-linear control mode. When in the non-linear control mode, the digital controller circuitry 100 initiates simultaneous activation of one or more high side switch in each of multiple power converter phases of the power supply to provide power to the dynamic load to prevent the output voltage 180 from falling outside the range.

In step 1555, depending on the rate of change associated with the output voltage 180 or detection of a transient condition in which the dynamic load instantaneously requires more or less current, the digital controller circuitry 100 switches between operating the power supply in a linear mode to a non-linear mode to produce the output voltage 180.

In one embodiment, as previously discussed, the digital controller circuitry 100 can monitor the output voltage 180 to detect a transient condition. In response to detecting the transient condition requiring more current, the digital controller circuitry 100 initiates simultaneous activation of high side switches in multiple power converter phases to supply additional power to the dynamic load during the transient condition.

Figure 17:
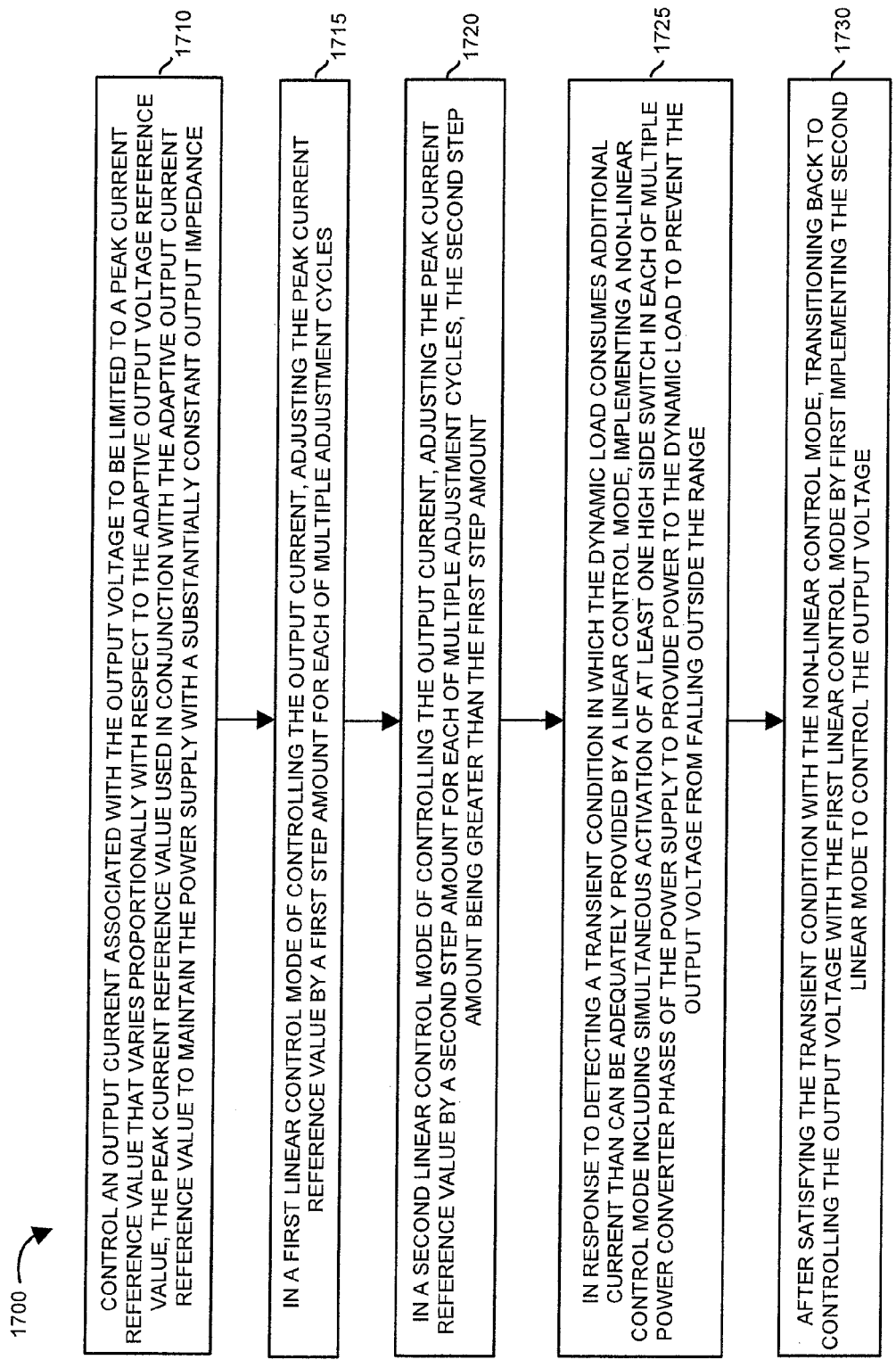

FIG. 17 is a flowchart 1700 illustrating a technique of improving power supply efficiency and responsiveness based on switching between different operational modes according to embodiments herein.

In step 1710, the digital controller circuitry 100 controls an output current associated with the output voltage 180 to be limited to a peak current reference value (Iref) that varies proportionally with respect to the adaptive output voltage reference value (Vref). As described herein, the peak current reference value is used in conjunction with the adaptive output current reference value to maintain the power supply within a substantially constant output impedance range. If desired, note that the digital controller circuitry 100 can be configured to control the output impedance at a non-fixed value (e.g., varying value) as well.

In step 1715, while in a first linear control mode of controlling the output current, the digital controller circuitry 100 adjusts the peak current reference value Iref by a first step amount for each of multiple adjustment cycles.

In step 1720, while in a second linear control mode of controlling the output current, the digital controller circuitry 100 adjusts the peak current reference value Iref by a second step amount for each of multiple adjustment cycles, the second step amount being greater than the first step amount so that the power supply is more responsive to outputting additional current to the dynamic load when so needed.

In step 1725, in response to detecting a transient condition in which the dynamic load consumes additional current than can be adequately provided when in a linear control mode, the digital controller circuitry 100 implements a non-linear control mode which includes simultaneous activation of at least one high side switch in each of multiple power converter phases of the power supply to provide power to the dynamic load to prevent the output voltage from falling outside of desired voltage range 180.

In step 1730, after satisfying the transient condition with operation of switches according to the non-linear control mode, the digital controller circuitry 100 transitions back to controlling the output voltage with the first linear control mode by first implementing the second linear mode (e.g., link mode) to control the output voltage 180.

Note that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
   monitoring an output voltage of a power supply, the output voltage used to supply power to a dynamic load;
   varying a rate of changing an adaptive output voltage reference value; and
   via a comparison of the output voltage with respect to the adaptive output voltage reference voltage value, controlling switching operation of the power supply to maintain the output voltage within a voltage range.

2. The method as in claim 1 further comprising:
   detecting a rate of change associated with the output voltage; and
   varying the rate of changing the adaptive output voltage reference value depending on the rate of change associated with the output voltage.

3. The method as in claim 1 further comprising:
   during a first operational mode, changing the adaptive output voltage reference value by a first step amount so that the adaptive output voltage reference value follows the output voltage; and
   during a second operational mode, increasing a rate of changing the adaptive output voltage reference value by changing the adaptive output voltage reference value by a second step amount, the second step amount being greater than the first step amount.

4. The method as in claim 1 further comprising:
   in response to detecting that the output voltage is greater than the adaptive output voltage reference value for a time duration, increasing a rate of changing the adaptive output voltage reference value.

5. The method as in claim 1, wherein controlling switching operation of the power supply to maintain the power supply output voltage within a voltage range includes:
   depending on the rate of change associated with the output voltage, switching from operating the power supply in a linear mode to a non-linear mode to produce the output voltage.

6. The method as in claim 5 further comprising:
   detecting the rate of change associated with the output voltage based on detecting that the adaptive output voltage reference value is greater than the output voltage for each of multiple successive sample times of comparing the adaptive output voltage reference value with the output voltage.

7. The method as in claim 6 further comprising:
   decreasing the adaptive output voltage reference value for each of the multiple successive sample times.

8. The method as in claim 1, wherein monitoring the output voltage of the power supply includes detecting a transient condition, the method further comprising:
   in response to detecting the transient condition, initiating simultaneous activation of high side switches in multiple power converter phases of the power supply to supply additional power to the dynamic load during the transient condition.

9. The method as in claim 1 further comprising:
   controlling an output current associated with the output voltage to be limited to a peak current reference value that varies proportionally with respect to the adaptive output voltage reference value, the peak current reference value used in conjunction with the adaptive output current reference value to maintain the power supply with a substantially constant output impedance; and
   in a first linear control mode of controlling the output current, adjusting the peak current reference value by a first step amount for each of multiple adjustment cycles; and
   in a second linear control mode of controlling the output current, adjusting the peak current reference value by a second step amount for each of multiple adjustment cycles, the second step amount being greater than the first step amount.

10. The method as in claim 9, wherein the second linear control mode provides a faster response for adjusting a magnitude of the output current to maintain the output voltage in the range than does a response associated with the first control mode for adjusting the output current.

11. The method as in claim 9 further comprising:
   in response to detecting a transient condition in which the dynamic load consumes additional current than can be provided by the first linear control mode or the second linear control mode within a predetermined amount of time, implementing a non-linear control mode including simultaneous activation of at least one high side switch in each of multiple power converter phases of the power supply to provide power to the dynamic load to prevent the output voltage from falling outside the range.

12. A system comprising:
   a processor;
   a memory unit that stores instructions associated with an application executed by the processor; and
   an interconnect coupling the processor and the memory unit, enabling the processor to execute the instructions and perform operations of:

monitoring an output voltage of a power supply, the output voltage used to supply power to a dynamic load;
varying a rate of changing an adaptive output voltage reference value; and
via a comparison of the output voltage with respect to the adaptive output voltage reference voltage value, controlling switching operation of the power supply to maintain the output voltage within a voltage range.

13. The system as in claim 12, wherein execution of the instructions further supports operations of:
detecting a rate of change associated with the output voltage; and
varying the rate of changing the adaptive output voltage reference value depending on the rate of change associated with the output voltage.

14. The system as in claim 12, wherein execution of the instructions by the processor further supports operations of:
when in a first operational mode, changing the adaptive output voltage reference value by a first step amount so that the adaptive output voltage reference value follows the output voltage; and
when in a second operational mode, increasing a rate of changing the adaptive output voltage reference value by changing the adaptive output voltage reference value by a second step amount, the second step amount being greater than the first step amount.

15. The system as in claim 12, wherein execution of the instructions by the processor further supports operations of:
in response to detecting that the output voltage is greater than the adaptive output voltage reference value for a time duration, increasing a rate of changing the adaptive output voltage reference value.

16. The system as in claim 12, wherein controlling switching operation of the power supply to maintain the power supply output voltage within a voltage range includes:
depending on the rate of change associated with the output voltage, switching from operating the power supply in a linear mode to a non-linear mode to produce the output voltage.

17. The system as in claim 16, wherein execution of the instructions by the processor further supports operations of:
detecting the rate of change associated with the output voltage based on detecting that the adaptive output voltage reference value is greater than the output voltage for each of multiple successive sample times in which the adaptive output voltage reference value is compared to the output voltage.

18. The system as in claim 17, wherein execution of the instructions by the processor further supports operations of:
decreasing the adaptive output voltage reference value for each of the multiple successive sample times.

19. The system as in claim 12, wherein execution of the instructions by the processor further supports operations of:
detecting a transient condition; and
in response to detecting the transient condition, initiating simultaneous activation of high side switches in multiple power converter phases of the power supply to supply additional power to the dynamic load during the transient condition.

20. The system as in claim 12, wherein execution of the instructions by the processor further supports operations of:
controlling an output current associated with the output voltage to be limited to a peak current reference value that varies proportionally with respect to the adaptive output voltage reference value, the peak current reference value used in conjunction with the adaptive output current reference value to maintain the power supply with a substantially constant output impedance; and
in a first linear control mode of controlling the output current, adjusting the peak current reference value by a first step amount for each of multiple adjustment cycles; and
in a second linear control mode of controlling the output current, adjusting the peak current reference value by a second step amount for each of multiple adjustment cycles, the second step amount being greater than the first step amount.

21. The system as in claim 20, wherein the second linear control mode provides a faster response for adjusting a magnitude of the output current to maintain the output voltage in the range than does a response associated with the first control mode for adjusting the output current.

22. The system as in claim 20, wherein execution of the instructions by the processor further supports operations of:
in response to detecting a transient condition in which the dynamic load consumes additional current than can be provided by the first linear control mode and the second linear control mode within a predetermined amount of time, implementing a non-linear control mode including simultaneous activation of at least one high side switch in each of multiple power converter phases of the power supply to provide power to the dynamic load to prevent the output voltage from falling outside the range.

23. A tangible computer-readable medium having instructions stored thereon, the instructions, when executed by a processing device, enabling the processing device to perform operations of:
monitoring an output voltage of a power supply, the output voltage used to supply power to a dynamic load;
adjusting an adaptive output voltage reference value; and
via a comparison of the output voltage with respect to the adaptive output voltage reference voltage value, controlling switching operation of the power supply to maintain the output voltage within a voltage range.

24. A tangible computer-readable medium as in claim 23, wherein the instructions, when executed by the processing device, enable the processing device to perform operations of:
monitoring an output current of a power supply, the output current used to supply power to a dynamic load;
adjusting a rate of changing an adaptive output current reference value; and
via a comparison of the output current with respect to the adaptive output current reference value, controlling switching operation of the power supply to maintain the output voltage within a voltage range.

25. A tangible computer-readable medium as in claim 24, wherein the instructions, when executed by the processing device, enable the processing device to perform operations of:
detecting a transient condition; and
in response to detecting the transient condition, initiating simultaneous activation of high side switches in multiple power converter phases of the power supply to supply additional power to the dynamic load during the transient condition.

26. The method as in claim 1 further comprising:
adjusting the adaptive output voltage reference value by a first step amount; and
based on detecting an increased rate of change associated with the output voltage, increasing a rate of changing the adaptive output voltage reference value.

27. The method as in claim 26, wherein increasing the rate of changing the adaptive output voltage reference value further comprises:

adjusting the adaptive output voltage reference value by a second step amount, the second step amount being greater than the first step amount.

28. The method as in claim 1, wherein controlling switching operation of the power supply further comprises:

comparing the output voltage to the adaptive output voltage reference value; and controlling activation of at least one switch in the power supply based on the comparison, activation of the at least one switch controlling a magnitude of the output voltage.

29. The method as in claim 1, wherein varying the rate of the adaptive output voltage reference value includes:

adjusting a magnitude of the adaptive output voltage reference values by different amounts depending on a nearness of the output voltage in magnitude with respect to the adaptive output voltage reference value.

* * * * *